(12) United States Patent
Abedini et al.

(10) Patent No.: US 11,202,272 B2
(45) Date of Patent: Dec. 14, 2021

(54) BEAM-SPECIFIC TIMING ADVANCE GROUPS

(71) Applicant: QUALCOMM Incorporated, San Diego, CA (US)

(72) Inventors: Navid Abedini, Somerset, NJ (US); Bilal Sadiq, Basking Ridge, NJ (US); Muhammad Nazmul Islam, Edison, NJ (US); Sundar Subramanian, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/192,363

(22) Filed: Nov. 15, 2018

(65) Prior Publication Data

US 2019/0159156 A1 May 23, 2019

Related U.S. Application Data

(60) Provisional application No. 62/588,024, filed on Nov. 17, 2017.

(51) Int. Cl.
*H04W 56/00* (2009.01)
*H04L 5/00* (2006.01)
(Continued)

(52) U.S. Cl.
CPC ....... *H04W 56/0045* (2013.01); *H04L 5/0048* (2013.01); *H04W 48/16* (2013.01); *H04W 56/0005* (2013.01); *H04W 74/0833* (2013.01)

(58) Field of Classification Search
CPC ............. H04W 56/0045; H04W 48/16; H04W 56/0005; H04W 74/0833; H04L 5/0048
(Continued)

(56) References Cited

U.S. PATENT DOCUMENTS 10,382,978 B2   8/2019  Lee et al.
2007/0265071 A1 11/2007 Ziemkowski et al.
(Continued)

FOREIGN PATENT DOCUMENTS

CN       103268639 A    8/2013
CN       105830483 A    8/2016
WO    WO-2017151876 A1  9/2017

OTHER PUBLICATIONS

Huawei., et al., "Maintenance of Uplink Time Alignment in NR", 3GPP Draft, R2-1711438 Maintenance of Uplink Time Alignment in NR, 3rd Generation Partnership Project (3GPP), Mobile Competence Centre, 650, Route Des Lucioles, F-06921 Sophia-Antipolis Cedex, Fran vol. RAN WG2, No. Prague, Czech Republic, Oct. 9, 2017-Oct. 13, 2017 Oct. 8, 2017 (Oct. 8, 2017), XP051343423, 3 Pages, Retrieved from the Internet: URL:http://www.3gpp.org/ftp/Meetings_3GPPSYNC/RAN2/Docs/[retrieved on Oct. 8, 2017].
(Continued)

*Primary Examiner* — Kwang B Yao
*Assistant Examiner* — Xuan Lu
(74) *Attorney, Agent, or Firm* — Holland & Hart LLP

(57) ABSTRACT

Methods, systems, and devices for wireless communications are described. Generally, the described techniques provide for adjusting communication timings of beams (e.g., of beam pair links) within a beam timing advance group (TAG). In some cases, a base station may determine that transmission timing at a UE may be misaligned between multiple beams. The base station may configure a set of beams into a beam TAG, and may send a timing advance (TA) command for the beam TAG. A common timing reference value may be identified based on the TA command. UEs performing uplink transmissions may determine a TA value for the beam TAG based on the common timing reference value, and may adjust a communication timing for
(Continued)

one or more of the beams within the beam TAG based at least in part on the common timing reference value and the timing advance value.

38 Claims, 17 Drawing Sheets

(51) Int. Cl.
*H04W 48/16* (2009.01)
*H04W 74/08* (2009.01)

(58) Field of Classification Search
USPC .......................................................... 370/350
See application file for complete search history.

(56) References Cited

U.S. PATENT DOCUMENTS

| | | | | |
|---|---|---|---|---|
| 2013/0301619 | A1* | 11/2013 | Singh | H04W 56/004 |
| | | | | 370/336 |
| 2014/0086219 | A1* | 3/2014 | Suzuki | H04W 56/0045 |
| | | | | 370/336 |
| 2014/0369341 | A1* | 12/2014 | Jeong | H04W 56/0045 |
| | | | | 370/350 |
| 2017/0013565 | A1* | 1/2017 | Pelletier | H04W 52/343 |
| 2018/0084546 | A1* | 3/2018 | Guo | H04W 56/0015 |
| 2018/0124724 | A1* | 5/2018 | Tsai | H04W 74/0833 |
| 2018/0235013 | A1* | 8/2018 | Jung | H04W 16/28 |
| 2018/0323855 | A1* | 11/2018 | Noh | H04W 72/042 |
| 2019/0053182 | A1* | 2/2019 | Choi | H04W 72/0413 |
| 2019/0174489 | A1* | 6/2019 | Dinan | H04W 72/0446 |
| 2019/0364439 | A1* | 11/2019 | Lee | H04W 24/10 |

OTHER PUBLICATIONS

International Search Report and Written Opinion—PCT/US2018/061571—ISA/EPO—dated Feb. 15, 2019.
HUAWEI., et al., "Considerations on Multi-panel Based Uplink Transmission," 3GPP TSG RAN WG1 Meeting #88, 3GPP Draft, R1-1701690,3rd Generation Partnership Project (3GPP), Mobile Competence Centre, 650, Route Des Lucioles, F-06921 Sophia-Antipolis Cedex, France, vol. RAN WG1, No. Athens, Greece, Feb. 13, 2017-Feb. 17, 2017, Feb. 12, 2017, XP051208856, 3 Pages, Retrieved from the Internet: URL: http://www.3gpp.org/ftp/Meetings_3GPP_SYNC/RAN1/Docs/ [retrieved on Feb. 12, 2017] The whole document.

* cited by examiner

BEAM-SPECIFIC TIMING ADVANCE GROUPS

CROSS REFERENCES

The present Application for Patent claims the benefit of U.S. Provisional Patent Application No. 62/588,024 by ABEDINI, et al., entitled "BEAM-SPECIFIC TIMING ADVANCE GROUPS," filed Nov. 17, 2017, assigned to the assignee hereof, and expressly incorporated herein.

BACKGROUND

The following relates generally to wireless communication, and more specifically to beam-specific timing advance groups.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some examples of a wireless communications system, a base station and a UE may communicate, for example using uplink (UL) transmissions from the UE to the base station, or downlink (DL) transmissions from the base station to the UE. An uplink transmission, for example, may have some delay between transmission at the UE and reception at the base station. To ensure that reception of various communications at the base station are aligned, the base station may apply a timing advance (TA) to scheduled transmissions (compensating for the delay such that transmissions may be aligned), and may indicate a TA value to various UEs within a geographic coverage area via a TA command. In some cases, UEs within a wireless communications system may be highly mobile, and a TA value corresponding to different devices may become inaccurate as UEs change positions and/or operation. Furthermore, in some examples of a wireless communications system (e.g., a 5G system), wireless nodes within a system may communicate via highly directional beams. For example, a base station and a UE may communicate via beams, including as part of beam pair links (BPLs), each BPL including a transmit beam of one wireless node (e.g., a UE) and a receive beam of a second wireless node (e.g., a base station). In some examples, a UE may communicate simultaneously using more than one BPL. Beams of the BPLs may be highly directional, and uplink BPLs and downlink BPLs for the same UE may be the same or different. In such a configuration, different BPLs may have different round trip times (RTTs) due to non-reciprocity, or may have different RTTs due to mobility of the UE. In such cases, transmission timing at the UE may be misaligned between BPLs, which may result in collisions and interference at the base station, decreasing performance of the wireless communications system. Moreover, the delay between a UE becoming misaligned to when a base station is able to send a new TA command may be large, during which time the UE may not be able to transmit uplink transmissions, or only a very limited set of uplink transmissions, such as random access signaling, but not data.

SUMMARY

The described techniques relate to improved methods, systems, devices, or apparatuses that support beam-specific timing advance groups. Generally, the described techniques provide for improved methods, systems, devices, or apparatuses that support the adjustment of transmission timing. Generally, the described techniques provide for adjusting transmission timing for beams (e.g., of beam pair links (BPLs)) within a beam timing advance group (TAG). In some cases, a base station may determine that transmission timings at a user equipment (UE) may be misaligned between two or more of multiple BPLs of the beam TAG. The base station may configure a set of BPLs into a beam TAG. The base station may send timing advance (TA) commands for the beam TAG. At the UE, a common timing reference value may be identified, for example based on the TA command. UEs performing uplink transmissions may determine a TA value for the beam TAG based on the TA command, and may adjust a communication timing (e.g., a transmission timing or reception timing) for one or more of the set of beams (or BPLs) within the beam TAG based at least in part on the identified common timing reference value and the timing advance value determined based on the received TA command. The common timing reference value may be determined based on one beam or BPL of the beam TAG, or multiple beams or BPLs of the beam TAG. For example, a reference beam or BPL, on which the common timing reference value may be based, may be indicated explicitly by the base station, implicitly by the base station, or autonomously determined by the UE. In some examples, the TA command may indicate a TA value that corresponds to all of the beams or BPLs of the beam TAG. In other examples, the TA command may indicate a set of TA values, each TA value corresponding to a beam or BPL of the beam TAG. In some examples, the TA command may indicate a common TA value which corresponds to all of the beams or BPLs of the beam TAG, and may also indicate a set of beam-specific or BPL-specific TA offset values, each TA offset value corresponding to a BPL of the beam TAG.

A method of wireless communication at a first wireless node is described. The method may include receiving, from a second wireless node, a timing advance (TA) command for a beam timing advance group (TAG) including a set of beams, the set of beams used for communications between the first wireless node and at least one of the second wireless node or a third wireless node, identifying a common timing reference value for the beam TAG, determining a TA value for the beam TAG based on the TA command, and adjusting a communication timing for one or more of the set of beams based on the identified common timing reference value and the determined TA value.

An apparatus for wireless communication at a first wireless node is described. The apparatus may include a processor, memory in electronic communication with the processor, and instructions stored in the memory. The instructions may be executable by the processor to cause the apparatus to receive, from a second wireless node, a TA command for a beam TAG including a set of beams, the set of beams used for communications between the first wireless node and at least one of the second wireless node or a third wireless node, identify a common timing reference value for the beam TAG, determine a TA value for the beam TAG based on the TA command, and adjust a communication timing for one or more of the set of beams based on the identified common timing reference value and the determined TA value.

Another apparatus for wireless communication at a first wireless node is described. The apparatus may include means for receiving, from a second wireless node, a TA command for a beam TAG including a set of beams, the set of beams used for communications between the first wireless node and at least one of the second wireless node or a third wireless node, identifying a common timing reference value for the beam TAG, determining a TA value for the beam TAG based on the TA command, and adjusting a communication timing for one or more of the set of beams based on the identified common timing reference value and the determined TA value.

A non-transitory computer-readable medium storing code for wireless communication at a first wireless node is described. The code may include instructions executable by a processor to receive, from a second wireless node, a TA command for a beam TAG including a set of beams, the set of beams used for communications between the first wireless node and at least one of the second wireless node or a third wireless node, identify a common timing reference value for the beam TAG, determine a TA value for the beam TAG based on the TA command, and adjust a communication timing for one or more of the set of beams based on the identified common timing reference value and the determined TA value.

In some examples of the method, apparatuses, and non-transitory computer-readable medium described herein, the beam TAG includes a set of beam pair links (BPLs) that include the set of beams, the set of BPLs used for communication between the first wireless node and at least one of the second wireless node or a third wireless node.

In some examples of the method, apparatuses, and non-transitory computer-readable medium described herein, determining the TA value for the beam TAG may include operations, features, means, or instructions for determining the TA value for the beam TAG based on the identified common timing reference value and a common TA value for the set of beams received in the TA command.

In some examples of the method, apparatuses, and non-transitory computer-readable medium described herein, determining the TA value for the beam TAG may include operations, features, means, or instructions for determining the TA value for the beam TAG based on the identified common timing reference value and a set of beam-specific TA values for respective beams of the set of beams received in the TA command.

In some examples of the method, apparatuses, and non-transitory computer-readable medium described herein, determining the TA value for the beam TAG may include operations, features, means, or instructions for determining the TA value for the beam TAG based on the identified common timing reference value and a common TA value corresponding to each beams of the set of beams, and with a set of beam-specific offsets from the common TA value received in the TA command, the set of beam-specific offsets for respective beams of the set of beams.

Some examples of the method, apparatuses, and non-transitory computer-readable medium described herein may further include operations, features, means, or instructions for comparing a reception timing of one of the set of beams and the reception timing of a reference beam, and determining a beam-specific TA offset value based on the comparison.

Some examples of the method, apparatuses, and non-transitory computer-readable medium described herein may further include operations, features, means, or instructions for receiving a beam-specific offset value for one or more beams of the set of beams in the TA command, or a random access response (RAR), or a media access control (MAC) control element (CE), or an radio resource control (RRC) message, or a combination thereof.

Some examples of the method, apparatuses, and non-transitory computer-readable medium described herein may further include operations, features, means, or instructions for identifying the common timing reference value for the set of beams may be based on one of a single beam of the set of beams, or multiple beams of the set of beams.

In some examples of the method, apparatuses, and non-transitory computer-readable medium described herein, identifying the common timing reference value may include operations, features, means, or instructions for identifying a beam of the set of beams as a reference beam, and identifying the common reference timing value based on the identified reference beam.

In some examples of the method, apparatuses, and non-transitory computer-readable medium described herein, identifying the beam as a reference beam further may include operations, features, means, or instructions for identifying a beam having received and applied a prior TA command more recently than any other beam in the set of beams.

In some examples of the method, apparatuses, and non-transitory computer-readable medium described herein, identifying the beam as a reference beam further may include operations, features, means, or instructions for receiving an indication from the second wireless node identifying the reference beam.

In some examples of the method, apparatuses, and non-transitory computer-readable medium described herein, a function of the reception timings across the set of beams at a time; or, and a function of the reception timings across the set of beams over a duration of time.

In some examples of the method, apparatuses, and non-transitory computer-readable medium described herein, the function may be one of an average value or an earliest value among the multiple reception timings.

Some examples of the method, apparatuses, and non-transitory computer-readable medium described herein may further include operations, features, means, or instructions for determining that a timing alignment timer may have expired based on identifying that a second TA command may have not been received during a predetermined duration, the timing alignment timer corresponding to a beam of the set of beams, or the beam TAG, or a combination thereof.

Some examples of the method, apparatuses, and non-transitory computer-readable medium described herein may further include operations, features, means, or instructions for identifying one or more TA constraints on the TA command, where the adjusting the communication timing may be based on the constraints.

In some examples of the method, apparatuses, and non-transitory computer-readable medium described herein, the one or more TA constraints include a maximum magnitude of change in one adjustment or a maximum magnitude of change over a predetermined duration.

In some examples of the method, apparatuses, and non-transitory computer-readable medium described herein, a first set of TA constraints applies to the set of beams of the beam TAG, and a second set of TA constraints applies to beams of a second beam TAG.

Some examples of the method, apparatuses, and non-transitory computer-readable medium described herein may further include operations, features, means, or instructions for transmitting, to the second wireless node, a measurement report for one or more beams of the set of beams, a reference signal using one or more beams of the set of beams, or an indication of a capability of the first wireless node to support beam TAGs.

In some examples of the method, apparatuses, and non-transitory computer-readable medium described herein, each beam of the set of beams may be quasi co-located with each other beam of the set of beams.

In some examples of the method, apparatuses, and non-transitory computer-readable medium described herein, the TA command for the beam TAG includes a set of TA commands, each TA command of the set of TA commands corresponding to one or more beams of the set of beams.

In some examples of the method, apparatuses, and non-transitory computer-readable medium described herein, the TA command includes an identifier providing a correspondence between a TA value of the TA command and a beam of the set of beams.

A method of wireless communication at a first wireless node is described. The method may include identifying a beam TAG including a set of beams, the set of beams used for communications between a second wireless node and at least one of the first wireless node or a third wireless node, identifying a common timing reference value for the set of beams of the identified beam TAG, and transmitting a TA command for the beam TAG based on the common timing reference value.

An apparatus for wireless communication at a first wireless node is described. The apparatus may include a processor, memory in electronic communication with the processor, and instructions stored in the memory. The instructions may be executable by the processor to cause the apparatus to identify a beam TAG including a set of beams, the set of beams used for communications between a second wireless node and at least one of the first wireless node or a third wireless node, identify a common timing reference value for the set of beams of the identified beam TAG, and transmit a TA command for the beam TAG based on the common timing reference value.

Another apparatus for wireless communication at a first wireless node is described. The apparatus may include means for identifying a beam TAG including a set of beams, the set of beams used for communications between a second wireless node and at least one of the first wireless node or a third wireless node, identifying a common timing reference value for the set of beams of the identified beam TAG, and transmitting a TA command for the beam TAG based on the common timing reference value.

A non-transitory computer-readable medium storing code for wireless communication at a first wireless node is described. The code may include instructions executable by a processor to identify a beam TAG including a set of beams, the set of beams used for communications between a second wireless node and at least one of the first wireless node or a third wireless node, identify a common timing reference value for the set of beams of the identified beam TAG, and transmit a TA command for the beam TAG based on the common timing reference value.

In some examples of the method, apparatuses, and non-transitory computer-readable medium described herein, the beam TAG includes a set of BPLs that include the set of beams, the set of BPLs used for communication between the first wireless node and at least one of the second wireless node or a third wireless node.

In some examples of the method, apparatuses, and non-transitory computer-readable medium described herein, transmitting the TA command for the beam TAG further may include operations, features, means, or instructions for transmitting the TA command with a common TA value for the set of beams.

In some examples of the method, apparatuses, and non-transitory computer-readable medium described herein, transmitting the TA command for the beam TAG further may include operations, features, means, or instructions for transmitting the TA command with a set of beam-specific TA values for respective beams of the set of beams.

In some examples of the method, apparatuses, and non-transitory computer-readable medium described herein, transmitting the TA command for the beam TAG further may include operations, features, means, or instructions for transmitting the TA command with a common TA value corresponding to each beam of the set of beams, and with a set of beam-specific offsets from the common TA value, the set of beam-specific offsets for respective beams of the set of beams.

Some examples of the method, apparatuses, and non-transitory computer-readable medium described herein may further include operations, features, means, or instructions for transmitting an indication of one or more beams of the set of beams that the second wireless node may be to use to determine the common timing reference value.

In some examples of the method, apparatuses, and non-transitory computer-readable medium described herein, identifying the beam TAG may include operations, features, means, or instructions for receiving a transmission from the second wireless node, and identifying the beam TAG based on the received transmission.

In some examples of the method, apparatuses, and non-transitory computer-readable medium described herein, the received transmission may include operations, features, means, or instructions for a report of measurements by the second wireless device for one or more beams of the set of beams; or, a reference signal from the second wireless node using one or more beams of the set of beams; or, an indicator of a capability of the second wireless node to support beam TAGs; or, and a combination thereof.

Some examples of the method, apparatuses, and non-transitory computer-readable medium described herein may further include operations, features, means, or instructions for transmitting a beam-specific offset value for one or more beams of the set of beams in the TA command, or a RAR, or a MAC CE, or an RRC message, or a combination thereof.

Some examples of the method, apparatuses, and non-transitory computer-readable medium described herein may further include operations, features, means, or instructions for identifying the common reference timing value may be based on, or, and a function of reception timings across the set of beams over a duration of time.

In some examples of the method, apparatuses, and non-transitory computer-readable medium described herein, the function may be one of an average value or an earliest value among the multiple reception timings.

Some examples of the method, apparatuses, and non-transitory computer-readable medium described herein may further include operations, features, means, or instructions for determining a timing alignment timer corresponding to a beam of the set of beams, or the beam TAG, or a combination thereof, where transmitting the TA command may be based on the timing alignment timer.

Some examples of the method, apparatuses, and non-transitory computer-readable medium described herein may further include operations, features, means, or instructions for determining that one or more beams of the set of beams may be operating above a maximum transmission timing difference for the set of beams, where transmitting the TA command may be based on the determining.

In some examples of the method, apparatuses, and non-transitory computer-readable medium described herein, the beam operating above the maximum transmission timing difference corresponds to the beam TAG, or corresponds to a second beam TAG.

In some examples of the method, apparatuses, and non-transitory computer-readable medium described herein, each beam of the set of beams may be quasi co-located with each other beam of the set of beams.

DETAILED DESCRIPTION

Figure 1:
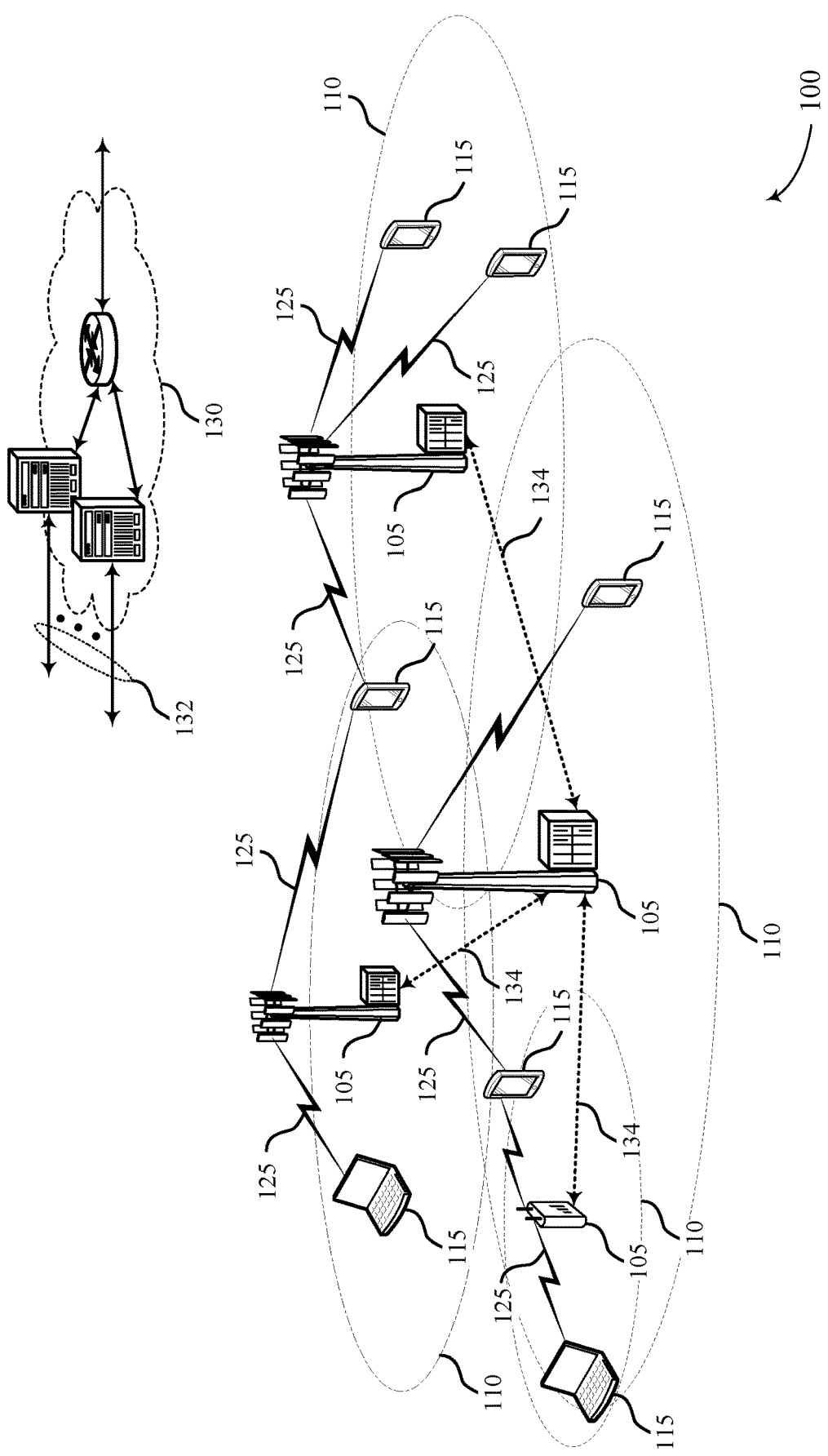
FIG. 1 illustrates an example of a system for wireless communication that supports beam-specific timing advance groups in accordance with aspects of the present disclosure.

In some examples of a wireless communications system, a wireless node (e.g., a user equipment (UE)) may communicate with another wireless node (e.g., a base station) via uplink or downlink transmissions. A transmission may be sent, for example, from a UE to a base station, and may take some amount of time between transmission at the UE and reception at the base station. That delay may be accounted for by a timing advance (TA) value. That is, a TA value may be applied to the scheduling of an uplink transmission such that the uplink transmission is sent earlier to account for the delay. Thus, a first UE in a wireless communications system may have a first delay and may apply a first TA value, and a second UE in a different location within the same wireless communications system may have a second delay and may apply a second TA value. The application of the first TA value and the second TA value to the first and second UEs may result in transmissions from the first UE and the second UE being aligned upon arrival at a base station. A base station may transmit a TA command, which may include a TA value, to a UE to indicate to the UE the TA value that the UE should use for uplink transmissions.

In some wireless communications systems, an initial TA value may be estimated by a base station based on a received random access channel (RACH) signal from a UE. The base station may transmit a TA command containing the TA value to the UE in a random access response (RAR). A base station may then regularly (e.g., in connected mode operation) estimate uplink timing based on uplink transmissions from the UE, such as a physical uplink control channel (PUCCH), a physical uplink shared channel (PUSCH) or a sounding reference signal (SRS). When uplink timing becomes misaligned, a base station may transmit an updated TA command to a UE to correct (realign) uplink transmission timing in a media access control (MAC) control element (CE). A UE may receive the TA command, and may adjust its uplink transmission timing according to the TA value. However, a delay in timing adjustment, between receiving the TA command and adjusting the transmission timing, may have a long duration (e.g., six subframes).

A transmission timing for a UE may be valid (aligned) or invalid (misaligned). A UE may determine whether its timing is valid or invalid based on a time alignment timer. The time alignment timer may be reset each time a TA command is received. If the time alignment timer expires without having received a TA command, then the UE may transmit a RACH transmission so as to trigger a TA command from the base station. The UE may be restricted from other uplink transmissions once the timer has expired, and until the UE receives a new TA command. In other cases, a UE may track an uplink transmission timing error, and may determine whether its uplink transmissions timing error is above an error threshold. If the uplink transmission timing error is above the threshold, then the uplink transmission timing may be considered valid. If the uplink transmission timing error is below the threshold, the UE may determine that its uplink transmission timing is considered invalid. If an uplink transmission timing is misaligned, a UE may transmit a RACH transmission to trigger a TA command from the base station, and the base station may transmit a TA command in response.

In some cases, a wireless communications system may use one or more timing advance groups formed of multiple serving cells. A timing advance group may be configured via higher layer signaling (e.g., a radio resource control (RRC) messages), and may include cells that use the same timing reference cell and the same timing advance value. In some examples, only cells of a same group are included in a timing advance group. That is, a timing advance group may include either master cell group (MSG) or a secondary cell group (SCG). However a timing advance group utilizing the same timing reference cell and the same timing advance value may not successfully align uplink transmissions in some cases.

In some examples of a wireless communications system, a base station and a UE may communicate via highly directional beams, including transmit beams and receive beams. For example, the UE and the base station may communicate via pair links (BPLs), each BPL including a transmit beam of one wireless node (e.g., a UE) and a receive beam of a second wireless node (e.g., a base station). In some examples, a UE may communicate with a base station simultaneously on more than one BPL, and different BPLs may have different round trip times (RTTs). For example, an uplink BPL and a downlink BPL for the same UE may not have reciprocity. That is, the uplink BPL may not share the same physical path as the downlink BPL. For example, the uplink BPL may follow a first physical path, reflecting off of one or more surfaces, and the downlink BPL may follow a second, different physical path, reflecting off of one or more difference surfaces. The downlink BPL's physical path may be longer or shorter than the uplink BPL's physical path. Thus, a TA value for the UE based on the downlink BPL, or based on a different BPL corresponding to another UE, may not successfully align an uplink transmission timing. Or, a UE may simultaneously communicate on various uplink and downlink BPLs. Although an uplink BPL may have reciprocity with a corresponding downlink BPL, the UE may multiplex uplink transmission across more than one uplink BPLs. Thus, a first uplink BPL may have a first RTT, and a second uplink BPL may have a second RTT. Thus, a TA value that might align the uplink transmission timing of one uplink BPL used by a UE, may not successfully align the uplink timing of another uplink BPL of the same UE.

In some examples, a UE may be highly mobile. Because the BPLs on which the UE communicates are highly directional, a RTT for a given BPL may change rapidly with time. Thus, a TA value applying to a BPL that previously successfully aligned uplink transmission from the UE, may no longer successfully align the uplink transmission timing of a BPL within the time when the UE is highly mobile. Or, a TA value that applies to a BPL may not successfully align an uplink transmission timing of another BPL of a UE that is highly mobile. Thus, a timing advance group that is based on common cells and common TA values, may not successfully align uplink transmission timings across multiple BPLs. Instead, a UE may apply different TA values to different BPLs in a timing advance group to ensure transmission timing alignment across multiple BPLs.

In some examples, a base station, or another network node, may configure BPLs into beam timing advance groups (TAGs). Beam TAGs may be organized such that each beam or BPL within a beam TAG corresponds to the same timing reference (a common timing reference). In some examples, beam TAGs may include transmit beams, or receive beams, or a combination of both transmit and receive beams. The beams of a beam TAG may be beam-specific (e.g., a beam TAG including transmit beams may be configured without regard for receive beams, or a beam TAG including receive beams may be configured without regard for transmit beams). Methods and techniques described herein may refer to BPLs, and BPL-specific TAGs and TA commands, etc. However, it will be understood that the methods, techniques, apparatuses, etc. may be similarly applied to beams, cells, time resources, frequency resources, or time-frequency resources (e.g., one or more TAGs may be configured to be cell-specific, time resource-specific, frequency resource-specific, time frequency resource-specific, or the like). The beams or BPLs within the beam TAG may have the same TA value, or a different TA value. The beam TAGs may be configured based on information received by the base station. For example, beam TAGs may be formed by the base station or a network node based on measurements received from the UE, RACH transmissions via one or more uplink BPLs, or capabilities and limitations of the UE.

In some examples, the timing reference may be provided by one timing reference BPL. The timing reference BPL may be predetermined (e.g., preconfigured in a manner known to both transmitting and receiving wireless nodes, including both a base station and UE), or indicated by the base station in control or management signaling. For example, the base station may explicitly indicate the timing reference BPL. Alternatively, the base station may implicitly identify the timing reference BPL. For example, the timing reference BPL may be whichever BPL of the beam TAG that has most recently received a TA command. In some examples, the timing reference may be provided by multiple BPLs. For example, the timing reference may be determined based on an average timing across the beam TAG at a particular time, based on an average timing across the beam TAG calculated across a particular time period, or based on an earliest timing of one of the BPLs in the beam TAG.

In some cases, a base station may transmit a single TA command to a UE, which indicates one or more TA values for the BPLs of the beam TAG. For example, the TA command may explicitly indicate each TA value, one TA value for each BPL of the beam TAG, or may indicate a common TA value for all BPLs of the beam TAG, or may indicate a common TA value and a set of TA offset values corresponding to each BPL of the beam TAG. The TA command may be transmitted upon expiration of a timing alignment timer, which may apply to a specific BPL of the beam TAG, or to the whole beam TAG. In some examples, a TA command may apply to the whole beam TAG. Alternatively, the base station may transmit multiple TA commands, each TA command corresponding to a respective BPL. One TA value may apply to all of the BPL in the beam TAG. Or, a TA command may carry multiple TA values, each TA value corresponding to respective BPLs of the beam TAG. In some cases, a TA command may carry a common TA value that applies to each of the BPLs of the beam TAG, and a set of BPL-specific TA offset values, one BPL-specific offset value per BPL of the beam TAG.

Aspects of the disclosure are initially described in the context of a wireless communications system. Aspects of the disclosure are further illustrated by and with reference to timing alignment schemes, and process flows. Aspects of the disclosure are further illustrated by and described with reference to apparatus diagrams, system diagrams, and flowcharts that relate to beam-specific timing advance groups.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3

GHz is known as the ultra-high frequency (UHF) region or decimeter band, since the wavelengths range from approximately one meter to one decimeter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an frequency division duplex (FDD) mode), or be configured to carry downlink and uplink communications (e.g., in a time division duplex (TDD) mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, a UE 115 and a base station may engage in adjusting transmission timings of BPLs within a configured beam TAG. In some examples, beam TAGs may include transmit beams, or receive beams, or a combination of both transmit and receive beams. The beams of a beam TAG may be beam-specific (e.g., a beam TAG including transmit beams may be configured without regard for receive beams, or a beam TAG including receive beams may be configured without regard for transmit beams). Methods and techniques described herein may refer to BPLs, and BPL-specific TAGs and TA commands, etc. However, it will be understood that the methods, techniques, apparatuses, etc. may be similarly be applied to beams, cells, time resources, frequency resources, or time-frequency resources (e.g., one or more TAGs may be configured to be cell-specific, time resource-specific, frequency resource-specific, time frequency resource-specific, or the like). In some cases, a base station may determine that transmission timings at a UE may be misaligned between multiple BPLs. The base station may configure a set of BPLs into a beam TAG, and may send a TA command for the beam TAG. A common timing reference value may be identified based on the TA command. A UE 115 performing uplink transmissions may determine a TA value for the beam TAG based on the TA command, and may adjust a communication timing (e.g., a transmission timing or reception timing) for one or more of the set of BPLs within the beam TAG based at least in part on the identified common timing reference value and the determined timing advance value.

Figure 2A:
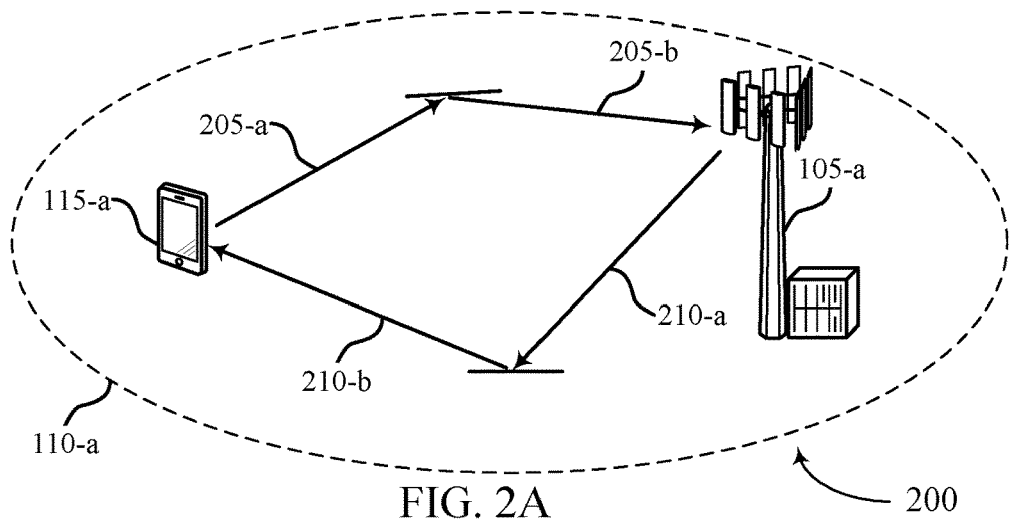
FIG. 2A illustrates an example of a wireless communications system that supports beam-specific timing advance groups in accordance with aspects of the present disclosure.

FIG. 2A illustrates an example of a wireless communications system 200 that supports beam-specific timing advance groups in accordance with various aspects of the present disclosure. In some examples, wireless communications system 200 may implement aspects of wireless communications system 100. Wireless communications system 200 may include a first wireless node, and a second wireless node. In some examples, the first wireless node may be a base station 105-a, and a second wireless node may be a UE 115-a, which may be examples of the corresponding devices described with reference to FIG. 1. In some cases, a second node may be base stations 105, where base station 105-a is a scheduling base station. In some examples, a first wireless node may be a base station 105 or relay, scheduling a second base station 105 or relay in a backhaul network or integrated access backhaul network (IAB). In some examples, a first wireless node may be a scheduling UE 115, and the second and third wireless nodes may be non-scheduling UE 115. For purpose of illustration only, the first wireless node may be referred to as base station 105-a, and the second wireless node may be referred to as UE 115-a. But, it should be understood that these are by way of example only, and that base station 105-a, UE 115-a, and UE 115-b could be examples of various wireless nodes as noted above and could be in communication with additional wireless nodes.

In some examples, a base station 105-a may communicate with one or more UEs 115 that are located within geographic coverage area 110-a. Base station 105-a may communicate with UEs 115 via highly directional BPLs. Each BPL may include a transmit beam (e.g. of uplink BPL 205-a and downlink BPL 210-a) and a receive beam (e.g., receive beam of uplink BPL 205-b, and receive beam of downlink BPL 210-b). For example, UE 115-a may communicate with base station 105-a via uplink BPL 205 and downlink BPL 210. In some examples, uplink BPL 205 and downlink BPL 210 may not be reciprocal BPLs, and therefore may not have the same physical path or the same RTT as each other.

Because uplink BPL 205 and downlink BPL 210 do not have the same RTT, propagation delay and transmission or reception delays may not be the same for each BPL. This may result in collisions or interference on communications between UE 115-a and base station 105-a. Furthermore, if all transmission timings corresponding to all BPLs of UE 115-a are realigned using the same TA value, in some cases one or more BPLs may still be misaligned due to the different RTTs of each BPL.

Figure 2B:
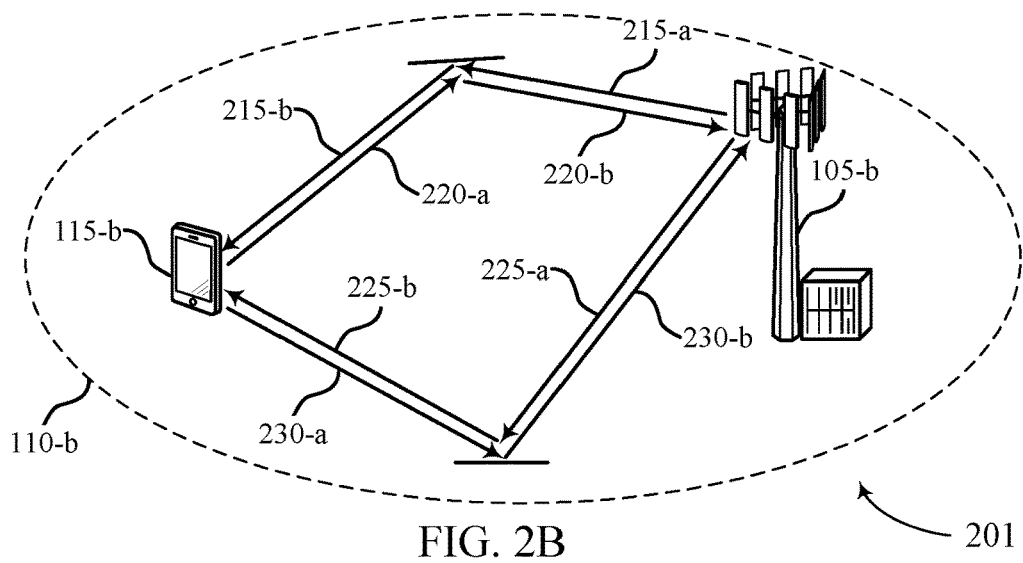
FIG. 2B illustrates an example of a wireless communications system that supports beam-specific timing advance groups in accordance with aspects of the present disclosure.

FIG. 2B illustrates another example of a wireless communications system 201 that supports beam-specific timing advance groups in accordance with various aspects of the present disclosure. In some examples, wireless communications system 201 may implement aspects of wireless communications systems 100 and 200. Wireless communications system 201 may include a first wireless node, and a second wireless node. By way of example, a first wireless node may be base station 105-b, and a second wireless node may be UE 115-b.

In some examples, base station 105-a may communicate with UEs 115 via highly directional BPLs. In some examples, UE 115-b may communicate with base station 105-a simultaneously on more than one BPL, such as BPLs 215, 220, 225, and 230. In some cases, each BPL may have different RTTs. For example, UE 115-b may be highly mobile, resulting in different RTTs for each BPL. In other examples, UE 115-b may send uplink transmissions via uplink BPL 220 and via uplink BPL 230. For instance, UE 115-b may multiplex various uplink transmissions across both uplink BPL 220 and uplink BPL 230. BPL 220 and BPL 230 may utilize different physical paths, may be reflected off of various surfaces, and therefore may have different RTTs. In such cases, uplink transmissions may suffer from collisions and interference due to timing misalignments. Furthermore, if all transmission timings corresponding to all BPLs of UE 115-b are realigned using the same TA value, in some cases one or more BPLs may still be misaligned due to the different RTTs of each BPL.

Figure 2C:
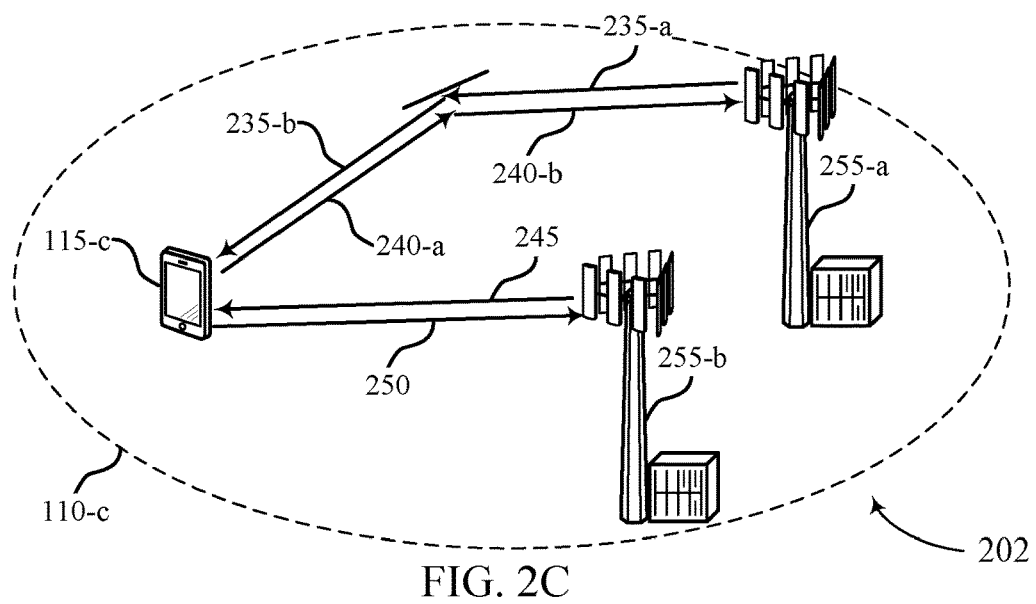
FIG. 2C illustrates an example of a wireless communications system that supports beam-specific timing advance groups in accordance with aspects of the present disclosure.

FIG. 2C illustrates another example of a wireless communications system 202 that supports beam-specific timing advance groups in accordance with various aspects of the present disclosure. In some examples, wireless communications system 202 may implement aspects of wireless communications systems 100, 200, and 201. Wireless communications system 202 may include a first wireless node, a second wireless node, and a third wireless node. By way of example, a first wireless node may be a network entity or base station 105-c, and a second wireless node may be a network entity or base station 105-d and a third wireless node may be UE 115-c. In some examples, a network entity may communicate with UEs 115 through a number of other access network transmission entities, which may be referred to as a radio head, a smart radio head, or a transmission/reception point (TRP).

In some examples, UE 115-c may communicate with TRP 255-c and TRP 255-d via multiple BPLs (e.g., BPL 235, 240, 245, and 250. In some cases, RTTs for BPLs 245 and 250 may be different, despite their reciprocity, due to mobility of UE 115-c. In some cases, RTTs for BPLs 245 and 250, and RTTs for BPLs 235 and 240, may be different, even while UE 115-c communicates simultaneously with TRP 255-c and TRP 255-d, each of which may be associated with the same base station 105.

In such cases, uplink transmissions may suffer from collisions and interference due to timing misalignments.

Furthermore, if all transmission timings corresponding to all BPLs of UE 115-*b* are realigned using the same TA value, in some cases one or more BPLs may still be misaligned due to the different RTTs of each BPL.

Referring to FIGS. 2A, 2B, and 2C, a UE 115 and a base station 105 communicating via multiple BPLs may experience collisions and interference as a result of misalignment of various BPLs. In some wireless communications systems, a base station 105 may transmit a TA command, indicating a TA value with which to adjust transmission timing to compensate for propagation delays or other causes of misalignment. However, if a UE 115 is utilizing multiple BPLs, then a single TA command for all BPLs may not resolve the misalignment of all of the BPLs.

In some examples, a base station 105 may configure multiple BPLs into beam TAGs, wherein the BPLs within the beam TAG may use a common timing reference value. The BPLs within the beam TAG may use the same TA value. Or, one or more of the BPLs within the beam TAG may use different TA values. The beam TAGs may be configured based on information received by base station 105-*a* from one of the UEs 115, such as measurements, transmission configurations, or capabilities information. The common timing reference value may be calculated based on a single BPL within the coverage area, or a multiple BPLs from the beam TAG. Formation of the beam TAG may further be based upon the expiration of a timing alignment timer, which may apply to a single BPL or all of the BPLs of a beam TAG. Beam TAGs may address timing misalignment at a UE 115 that is communicating via multiple BPLs, with multiple respective RTTs.

A UE 115 may receive, from a base station 105, a TA command for a beam TAG comprising a set of beams (which as used here may include may also refer to beams of a set of BPLs), the set of beams (e.g., or BPLs) used for communications between the UE 115 and at least one of the base station 105 or another wireless node, identifying a common timing reference value for the beam TAG, determine a TA value for the beam TAG based at least in part on the TA command, and adjust a communication timing (e.g., a transmission timing or reception timing) for one or more of the set of beams based at least in part on the identified common timing reference value and the determined TA value. An advantage of receiving such TA commands for a beam TAG, identifying such a common timing reference value, and adjusting a communication timing (e.g., a transmission timing or reception timing) based thereon may be to improve timing control and address timing misalignment, even when communicating on multiple beams with multiple respective RTTs.

In some examples, the UE 115 may determine the TA value for the beam TAG based at least in part on the identified common timing reference value and a common TA value for the set of beams received in the TA command. An advantage of determining the TA value based on the common timing reference value and a common TA value for the set of beams may be to improve timing control and address timing misalignment, even when communicating on multiple beams with multiple respective RTTs.

In some examples, the UE 115 may determine the TA value for the beam TAG based at least in part on the identified common timing reference value and a set of beam-specific TA values for respective beams of the set of beams received in the TA command. An advantage of determining the TA value based on the common timing reference value and a set of specific TA value for the respective beams may be to improve timing control and address timing misalignment, even when communicating on multiple beams with multiple respective RTTs.

In some examples, the UE 115 may determine the TA value for the beam TAG based at least in part on the identified common timing reference value and a common TA value corresponding to each beam of the set of beams, and with a set of beam-specific offsets from the common TA value received in the TA command, the set of beam-specific offsets for respective beams of the set of beams. An advantage of determining the TA value based on the common timing reference value and a common TA value corresponding to each beam of the set of beams may be to improve timing control and address timing misalignment, even when communicating on multiple beams with multiple respective RTTs.

Some examples the UE 115 may compare a reception timing of one of the set of beams and the reception timing of a reference beam, and may determine a beam-specific TA offset value based at least in part on the comparison. An advantage of determining the TA value based on the comparing may be to improve timing control and address timing misalignment, even when communicating on multiple beams with multiple respective RTTs.

A base station 105 may identify a beam TAG comprising a set of beams, the set of beams used for communications between a UE 115 and at least one of the base station 105 or another wireless node, identify a common timing reference value for the set of beams of the identified beam TAG, and transmit a TA command for the beam TAG based at least in part on the common timing reference value. An advantage of identifying beam TAGs, identifying such common timing reference values, and transmitting such TA commands, may be to improve timing control and address timing misalignment, even when communicating on multiple beams with multiple respective RTTs.

In some examples the base station 105 may transmit the TA command with a common TA value for the set of beams. An advantage of transmitting the TA command with a common TA value, may be to improve timing control and address timing misalignment, even when communicating on multiple beams with multiple respective RTTs.

In some examples, the base station 105 may transmit the TA command with a set of beam-specific TA values for respective beams of the set of beams. An advantage of transmitting the TA command with a set of beam-specific TA values, may be to improve timing control and address timing misalignment, even when communicating on multiple beams with multiple respective RTTs.

In some examples, the base station 105 may transmit the TA command with a common TA value corresponding to each beam of the set of beams, and with a set of beam-specific offsets from the common TA value, the set of beam-specific offsets for respective beams of the set of beams. An advantage of transmitting the TA command with a common TA value and a set of beam-specific offsets form the common TA value, may be to improve timing control and address timing misalignment, even when communicating on multiple beams with multiple respective RTTs.

Some examples, the base station 105 may transmit an indication of one or more beams of the set of beams that the UE 115 may be to use to determine the common timing reference value. An advantage of transmitting the indication of one or more beams may be to improve timing control and address timing misalignment, even when communicating on multiple beams with multiple respective RTTs.

Figure 3:
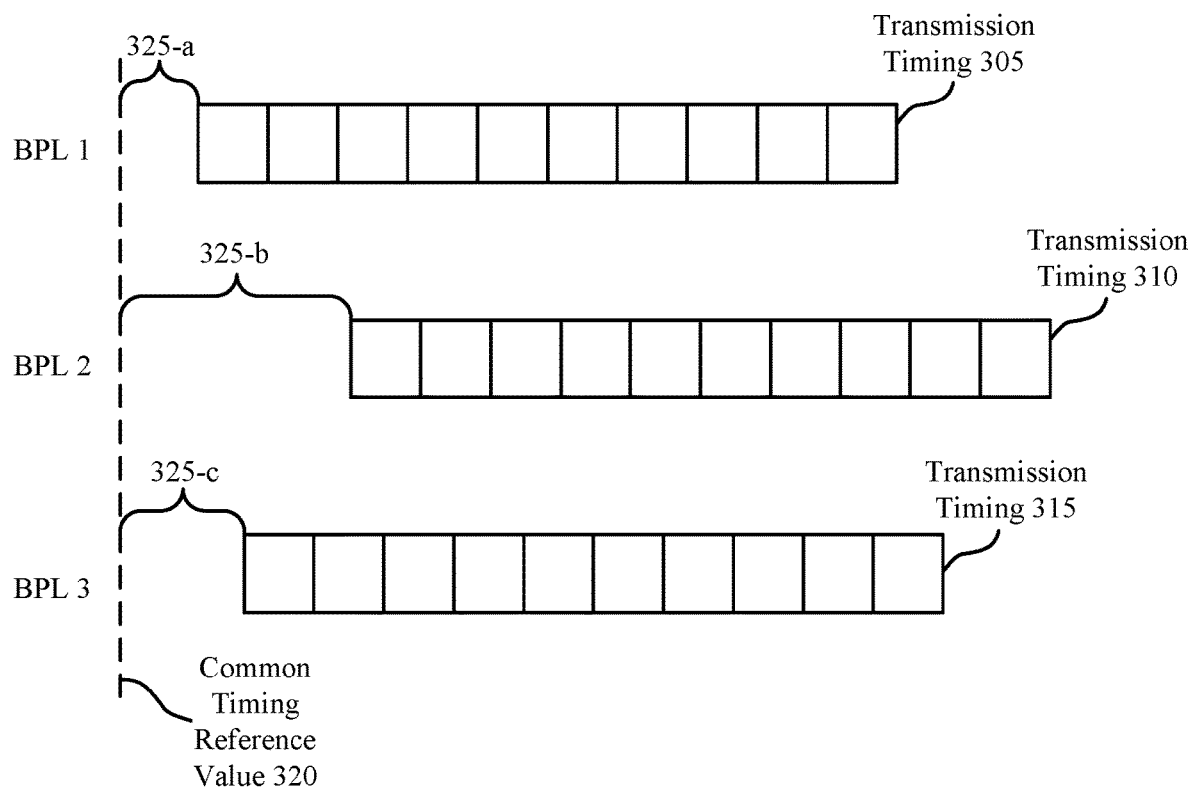
FIG. 3 illustrates an example of a timing alignment scheme that supports beam-specific timing advance groups in accordance with aspects of the present disclosure.

FIG. 3 illustrates an example of a timing alignment scheme 300 that supports beam-specific timing advance groups in accordance with various aspects of the present disclosure. In some examples, timing alignment scheme 300 may implement aspects of wireless communications system 100, 200, 201, and 202. Aspects of timing alignment scheme 300 may be implemented by a UE 115 and a base station 105, which may be examples of corresponding deices with respect to wireless communications systems 100, 200, 201, and 202.

In some examples, a UE 115 may communicate with a base station 105 via multiple BPLs (e.g., or beams in other examples). Because of mobility within the system, lack off reciprocity between uplink BPLs and downlink BPLs, or because of maximum permissible exposure (MPE) issues (e.g., wherein an uplink BPL and a downlink BPL may follow different physical paths to avoid generating a power density above a threshold), a single TA value for a UE 115 may result in misaligned uplink transmission timing. Instead, a base station 105 may form a beam TAG, and transmit a TA command to the UE 115, with one or more TA values corresponding to the BPLs of the beam TAG.

For example, a beam TAG may include BPL1, BPL2, and BPL3. Each of BPL1, BPL2, and BPL3 may carry transmissions that become misaligned for transmission timings 305, 310, and 315. It may therefore be beneficial to identify a common timing reference value 320, and adjust the transmission timings to be aligned with respect to the common timing reference value 320.

Common timing reference value 320 may be determined based on one BPL, or multiple BPLs of the beam TAG. For example, one of BPL1, BPL2, and BPL3 may be used as a reference BPL, upon which the common timing reference value 320 is based. In some cases, the reference BPL may be predetermined and known at the UE 115, or configured via higher layer signaling (e.g., an RRC message). In some examples, a base station 105 may identify, for example, BPL1 as the reference BPL, and TA value 330 and TA value 335 may be applied based on the identification of BPL1 as the reference BPL. In some examples, base station 105 may transmit an explicit indication, indicating BPL1 as the reference BPL. Alternatively, a UE 115 may identify a reference BPL, such as BPL1, without input from base station 105.

In some cases, base station 105-a may explicitly indicate which BPL, such as BPL1, is to be the reference BPL. For example, a reference BPL may change with respect to time, and a base station 105 may dynamically indicate a current reference BPL. In other examples, the reference BPL or common timing reference value 320 may be implicitly indicated to a UE 115. For example, in some cases, a TA command including TA value 325 may be transmitted, and applied to BPL1 by a UE 115. The TA command including TA value 325, may be transmitted prior to a TA command with TA value 330 for BPL2, or a TA command including TA value 335 for BPL3. In some cases, a UE 115 may be configured to identify a reference BPL based on which BPL has most recently applied a TA value. If TA value 325 has been received and applied to BPL1, and TA value 330 has not been received or applied to BPL2, then UE 115 may temporarily identify BPL1 as a current reference BPL. When TA value 330 is received and applied to BPL2, UE 115 may identify BPL2 as the new current reference BPL.

In some examples, common timing reference value 320 may be determined based on multiple BPLs, for example using a spatial filtering or temporal filtering process. For example, base station 105 or UE 115 may determine the common timing reference value 320 based on a function of reception time across BPL1, BPL2, and BPL3, as measured at an identified time. The function may be, for example, an average reception time, or an earliest value among the reception times of BPL1, BPL2, or BPL3. Base station 105 or UE 115 may determine the common timing reference value based on a function of reception timings across BPL1, BPL2, and BPL3, as measured across a duration of time. In some examples, common timing reference value 320 may be determined based on which transmission timing is earliest. For example, transmission timing 305 is earlier than transmission timing 310, or transmission timing 315, and BPL1 may be identified as the reference BPL.

UE 115 may receive one TA command, or multiple TA commands. TA commands may be transmitted via one BPL (e.g., a reference BPL), or via multiple BPLs (e.g., BPL1, BPL2, and BPL3 of a beam TAG), or via a BPL of another beam TAG. The TA command may include an identifier corresponding to the beam TAG to which the TA command corresponds.

In some cases, a single TA command may carry one TA value, or a single TA command may carry multiple TA values. For example, each of BPL1, BPL2, and BPL3 may be misaligned by a different amount of time. A single TA command may be transmitted to UE 115, and may carry multiple TA values. For example, a TA command may carry TA value 325, TA value 330, and TA value 335. TA value 325 may applied to BPL1, TA value 330 may apply to BPL2, and TA value 335 may apply to BPL3, resulting in an alignment of transmission timing 305, transmission timing 310, and transmission timing 315. In some examples, a first TA command may carry TA value 325, a second TA command may carry TA value 330, and a third TA command may carry TA value 335.

In some cases, a single TA command may carry additional information. For example, the TA command may carry an identifier, identifying that the TA command corresponds to a beam TAG including BPL1, BPL2, and BPL3. The TA command may further include an identifier (such as a bit-map), providing mapping between TA value 325, TA value 330, and TA value 335, and BPL1 of the beam TAG, BPL2 of the beam TAG, and BPL3 of the beam TAG.

Figure 4:
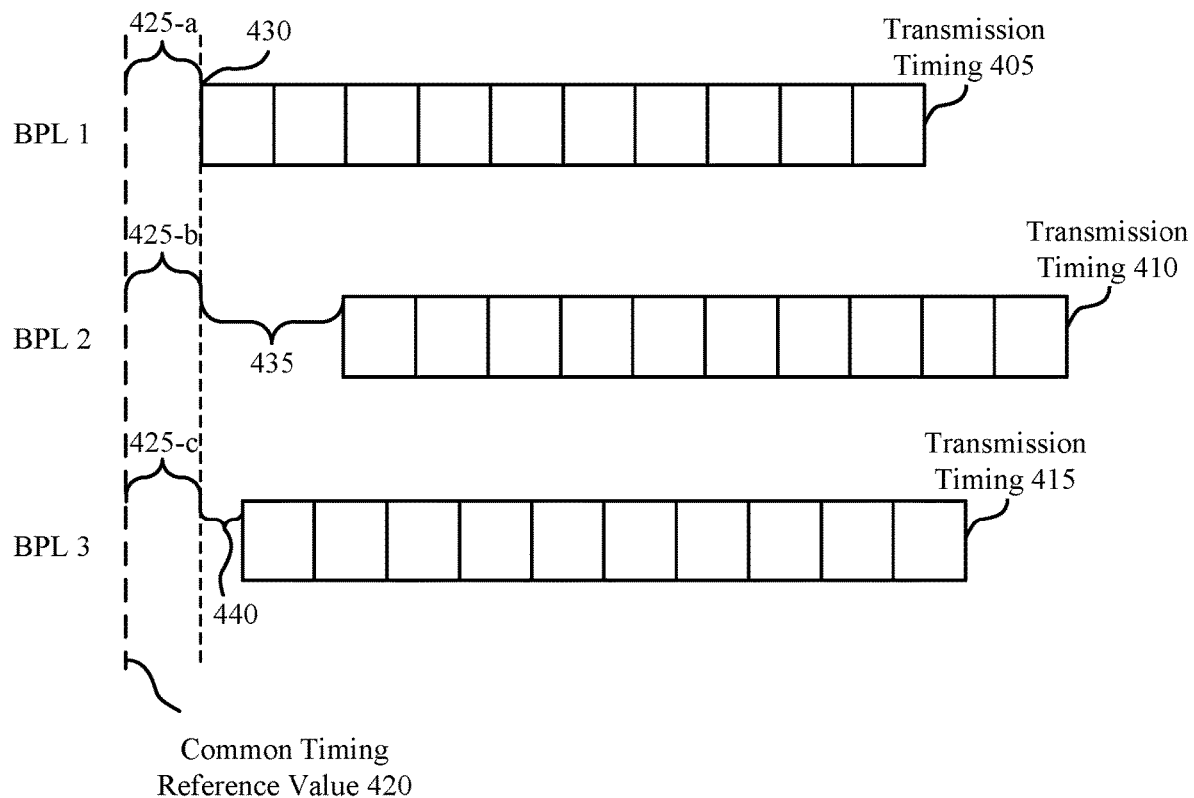
FIG. 4 illustrates an example of a timing alignment scheme that supports beam-specific timing advance groups in accordance with aspects of the present disclosure.

FIG. 4 illustrates an example of a timing alignment scheme 400 that supports beam-specific timing advance groups in accordance with various aspects of the present disclosure. In some examples, timing alignment scheme 400 may implement aspects of wireless communications system 100, 200, 201, and 202. Aspects of timing alignment scheme 400 may be implemented by a UE 115 and a base station 105, which may be examples of corresponding devices with respect to wireless communications systems 100, 200, 201, and 202.

As discussed with reference to FIG. 3, in some cases a UE 115 may communicate via multiple BPLs (e.g., or beams in other examples), such as BPL1, BPL2, and BPL3 (which may also be beam1, beam2, and beam3 in some examples). Some BPLs may have different RTTs than other BPLs, and base station 105 may identify one or more beam TAGs based on a common timing reference value 420. Common timing reference value 420 may be based on one or more of BPL1, BPL2, and BPL3, all of which may be included in a beam TAG. Transmission timing 405, transmission timing 410, and transmission timing 415 of BPL 1, BPL2, and BPL3, respectively, may be adjusted to be aligned with respect to time based on common timing reference value 420.

In some cases, BPL1, BPL2, and BPL3 may each have a different transmission timing 405, 410, and 415. That is, each of transmission timing 405, 410, and 415 may be misaligned by a different amount of time, requiring different offsets to become aligned. For example, in the absence of timing applying a timing advance at a transmitter, transmissions using BPL1, BPL2, and BPL3 would arrive at a receiver at different times, for example due to differing transmission time delays for BPL1, BPL2, and BPL3. In some examples, one or more TA commands may include a common TA value and one or more BPL-specific TA offsets. For example, a TA command may include a common TA value 425 that applies to BPL1, BPL2, and BPL3. However, transmission timing 405, for example, may be misaligned by a different amount of time than transmission timing 410. Thus, some additional offset from the common timing reference value 420 may be applied.

For BPL1, common TA value 425-a may be sufficient to align transmission timing 405 with respect to common timing reference value 420 (e.g., the difference between a desired arrival time and an actual arrival time for transmissions using BPL1 may be less than a threshold amount). In such cases, TA Offset 430 may be equal to zero. Transmission timing 410 for BPL2 may be misaligned by a different amount of time than transmission timing 405, and thus may require a different offset. A TA command may carry common TA value 425-b, and may also indicate TA offset 435 for BPL2. The combination of common TA value 425-a and TA offset 435 may be sufficient to correctly align transmission timing 410 of BPL2 with respect to common timing reference value 420. Similarly, transmission timing 415 may be misaligned with respect to common timing reference value 420 by a different amount of time than transmission timing 405 or transmission timing 410. The TA command may carry a common TA value 425-c, and additionally may indicate a TA offset 440 specifically for BPL3. The combination of common TA value 425-c and TA offset 440 (which is specific to BPL3), may be sufficient to correctly align transmission timing 415 with common timing reference value 420.

In some cases, a TA command may carry additional information. For example, the TA command may carry an identifier, identifying that the TA command corresponds to a beam TAG including BPL1, BPL2, and BPL3. BPL-specific TA offsets 430, 435, and 440 may be included in the TA command, or in multiple TA commands (one TA command for each BPL). In some cases, a TA command may include an identifier (e.g., a bit map), which may map the BPL-specific TA offsets 430, 435, and 440 to BPL1, BPL2, and BPL3 respectively. Alternatively, BPL-specific TA offsets 430, 435, and 440 may be dynamically indicated to a UE 115 by base station 105 via a different MAC CE or a RAR. In some examples, BPL-specific TA offsets 430, 435, and 440 may be configured at a UE 115 via higher layer signaling (e.g., an RRC message).

In some examples, a UE 115 may receive common TA value 425 from base station 105, but may autonomously determine BPL-specific TA offsets 430, 435, and 440. UE 115 may determine BPL-specific TA offsets 430, 435, and 440 by comparing reception timing of BPLs to a reception timing of a reference BPL. For example, in a case where BPL1 is a reference BPL, UE 115 may compare a reception timing of BPL2 and BPL3 to BPL1, and may determine BPL-specific TA offsets 430, 435, and 440 based on the comparison. In some cases the downlink timing of a BPL may be compared against the downlink timing of a reference BPL, and the UE 115 may apply a timing offset of twice the difference for the uplink timing for the BPL.

Figure 5:
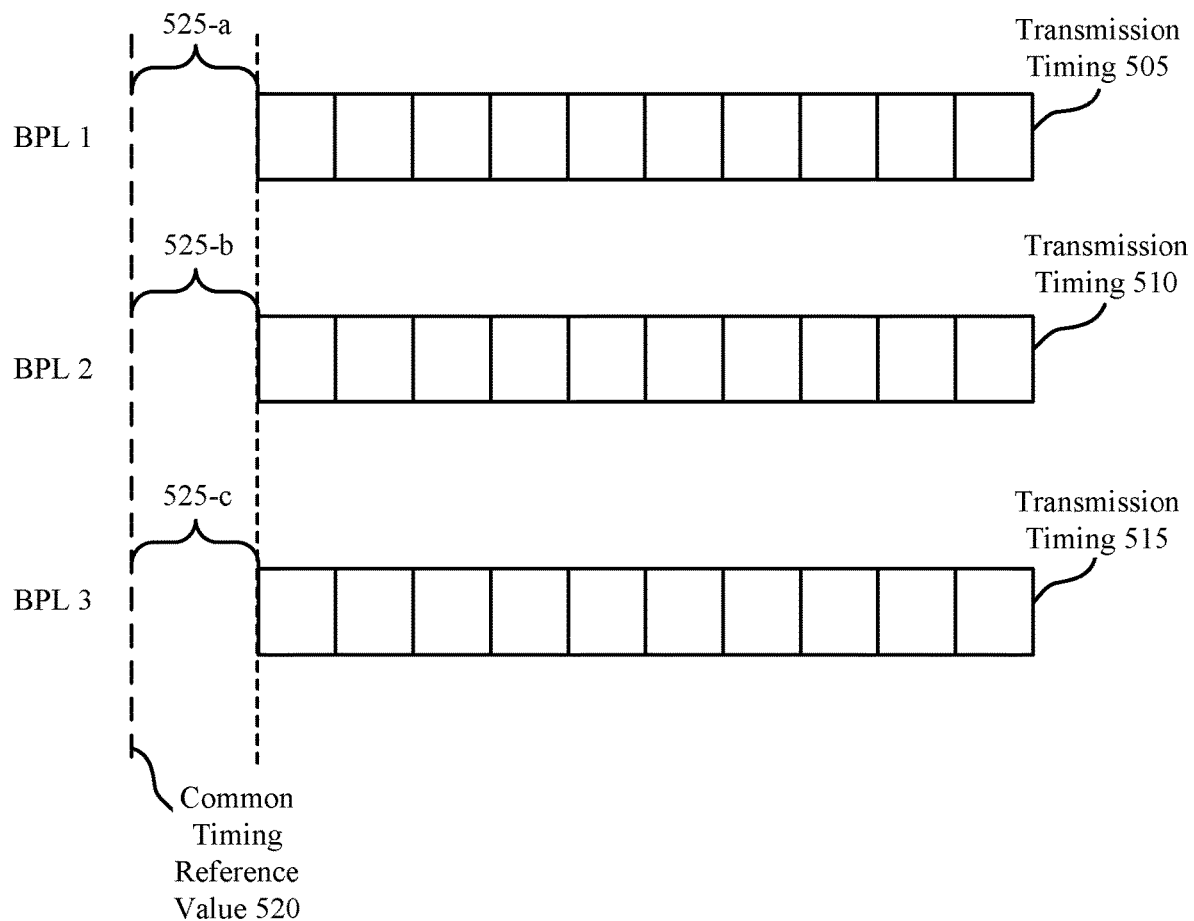
FIG. 5 illustrates an example of a timing alignment scheme that supports beam-specific timing advance groups in accordance with aspects of the present disclosure.

FIG. 5 illustrates an example of a timing alignment scheme 500 that supports beam-specific timing advance groups in accordance with various aspects of the present disclosure. In some examples, timing alignment scheme 500 may implement aspects of wireless communications system 100. Aspects of timing alignment scheme 500 may be implemented by a UE 115 and a base station 105, which may be examples of corresponding deices with respect to wireless communications systems 100, 200, 201, and 202.

As discussed with reference to FIG. 3, in some cases, a UE 115 may communicate via multiple BPLs (e.g., or beams in other examples), and some BPLs (or beams) may have different RTTs than other BPLs. In some cases, base station 105 may identify one or more beam TAGs. In some cases, each of BPL1, BPL2, and BPL3 (or beam1, beam2, or beam3 in other examples) may be misaligned with respect to a common timing reference value 420, which may be determined based on one or more of the BPLs of a beam TAG as described with reference to FIG. 3. Transmission timing 505, transmission timing 510, and transmission timing 515 may be adjusted to align with common timing reference value 420.

Base station 105 may transmit one or more TA commands, carrying one or more TA values. In some examples, a single TA value may be applied to BPL1, BPL2, and BPL3, which may all be included in a beam TAG. A single TA command may include a single TA value (e.g., TA value 525, TA value 530, and TA value 535 may be a single TA value) which may be applied to each of BPL1, BPL2, and BPL3. In some examples, a single TA command may include multiple TA values, but each TA value may be the same (e.g., a common TA value). In some examples, multiple TA commands may respectively carry TA value 525, TA value 530, and TA value 535. In each case, UE 115 may apply the received TA values 525, 530 and 535 to transmission timing 505, transmission timing 510, and transmission timing 515 to align the transmission timings with respect to the common timing reference value of the beam TAG.

Referring to FIGS. 3, 4, and 5, a base station 105 may receive an uplink transmission, and may identify or form a beam TAG based on the received uplink transmission. For example, the uplink transmission may include one or more measurements corresponding to downlink BPLs of a set of BPLs. A UE 115-a may include these measurements in an uplink transmission. Additionally or alternatively, the uplink transmission may include a random access transmission, such as an L1 or an L2 signal. The signals may utilize one uplink BPL of the BPLs corresponding to the beam TAG, or multiple uplink BPLs of the BPLs corresponding beam TAG.

In some examples, the uplink transmission may include an indication of capabilities or limitations at the UE 115. For example, a capability indicator may indicate how many beam TAGs a UE 115 can support. A capability indicator may indicate whether a UE can support receiving a single TA command, multiple TA commands, a common TA value, or multiple BPL-specific values, whether a UE 115 can autonomously determine BPL-specific TA offsets or whether BPL-specific TA values and TA offsets should be indicated explicitly to the UE 115. In some cases, a capacity or capabilities indicator may indicate which of the above mentioned cases the UE 115 supports or prefers. In some cases, a capabilities indicator may include an indication of whether the UE 115 supports beam reciprocity. A capabilities indicator may indicate an MPE issue with respect to one or multiple BPLs. In such a case, a capabilities indicator may indicate that a power density threshold at a given point will be exceeded if one or multiple BPLs pass through that point, which may result in the one or multiple BPLs having to follow different paths from each other. A capabilities indicator may further indicate radio frequency or digital processing capabilities, or use of antenna subarrays in beamforming and data transmission. Base station 105 may receive one, some, or each of these indicators in one or more uplink transmissions, and may identify or form a beam TAG based on one or any combination of the received uplink transmissions. For example, base station 105 may receive a capabilities indication from UE 115 which indicates support for a single TA command with multiple BPL-specific TA values, and an indication of whether UE 115 supports beam reciprocity, and may from a beam TAG based on one or both capacities.

In some examples, base station 105 may form a beam TAG in which each BPL of the beam TAG is quasi co-located with each of the other BPLs of the beam TAG. In some examples, the BPLs of the beam TAG may be spatially quasi co-located. In other examples, each BPL of the beam TAG may be quasi co-located with respect to one or more parameters. The parameters may include, for example, timing delay, a delay spread, a Doppler shift, a Doppler spread, or other parameters.

Transmitting a TA command to align misaligned transmission timings may be triggered by the expiration of a timing alignment timer. The timing alignment timer may correspond to a beam TAG, or one BPL within a beam TAG. The timing alignment timer may be rest each time a TA command is received. Upon expiration of the timer without having received a TA command, a UE 115 or base station 105 may assume that the transmission timing of its corresponding BPLs is misaligned. The base station may identifying a beam TAG and transmit a TA command following expiration of the timer. In some examples, a UE 115 may transmit a request indicating that the timing alignment timer has expired, and the base station 105 may transmit a TA command in response to the request.

In some cases, a maximum timing difference may be defined for BPL1, BPL2, and BPL3 of a beam TAG. In some cases, a maximum timing difference may be defined for BPLs of multiple beam TAGs. A maximum timing difference may define a maximum misalignment between included BPLs of one or multiple beam TAGs. Upon determining that a timing difference between BPLs exceeds the maximum timing difference, a UE 115 may determine that the transmission timings of one or more BPLs are misaligned, and may initiate the procedure for receiving a TA command. For example, UE 115 may send an uplink transmission (e.g., a measurement report, a RACH message, or a capability indicator) and base station 105 may transmit one or more TA commands, initiating a timing alignment between the included BPLs. The TA constraints may apply to a single beam TAG, or across multiple beam TAGs, and may be beam TAG-specific, or BPL-specific. In some examples, the TA constraints may be known or preconfigured at a UE 115. In other examples, base station 105 may indicate the TA constraints to UE 115.

In some examples, adjusting a timing alignment between transmission timings of different BPLs may be restricted by TA constraints. For example, when UE 115 adjusts the transmission timing of BPL1 (or another BPL of a different beam TAG), a maximum or minimum magnitude of change may constrain the adjustment. The maximum and minimum values may be aggregated to determine a magnitude of change. That is, the transmission timing of BPL1 may only be adjusted at or less than some threshold or at or more than a threshold in a single adjustment. In some examples, the transmission timing of BPL1 may only be adjusted by no more than some threshold amount across multiple adjustments or across a duration of time. In some examples, a base station 105 may transmit an indication of the TA constraints. Alternatively, the TA constraints may be predetermined and known at a UE 115 and a base station 105.

Figure 6:
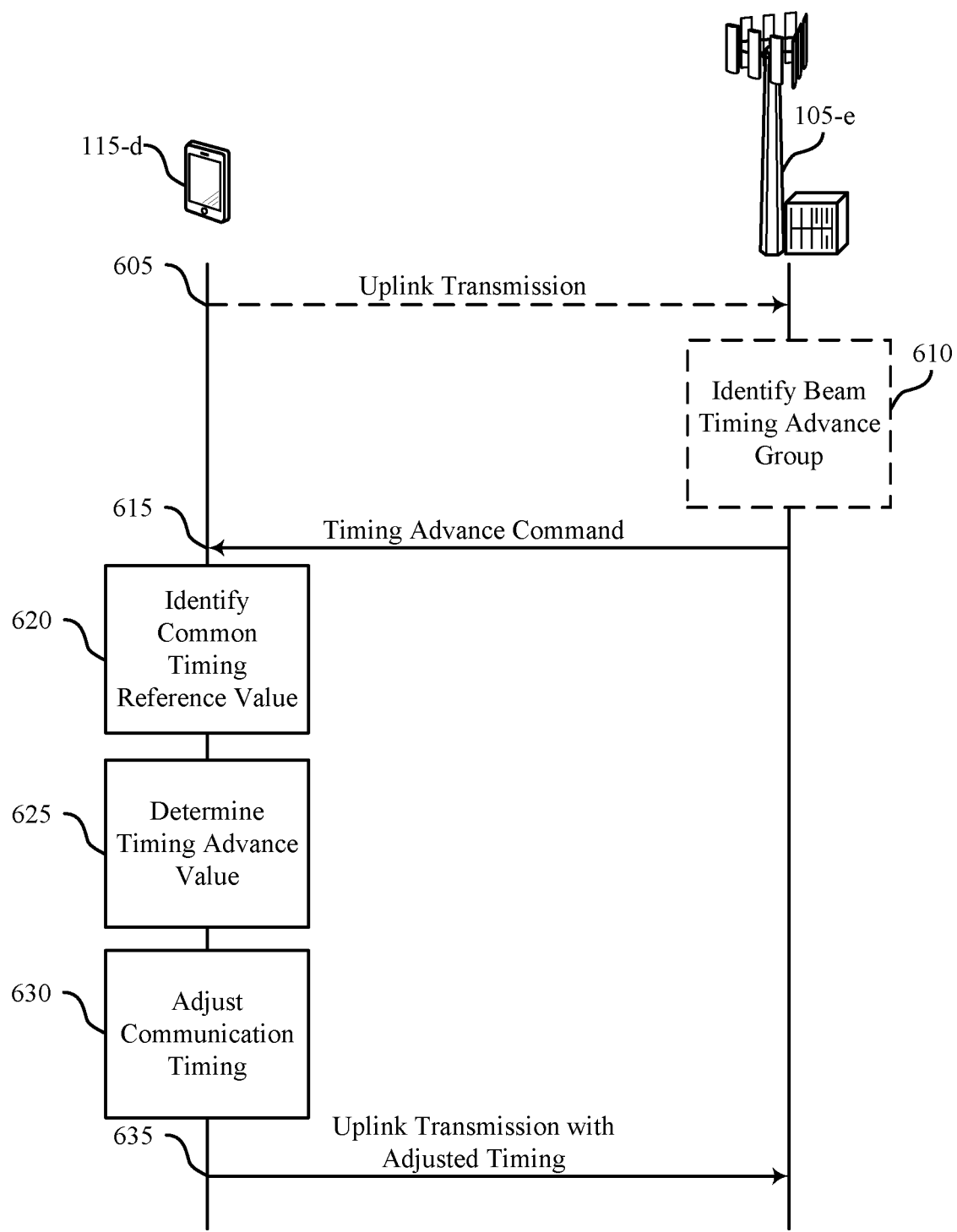
FIG. 6 illustrates an example of a process flow that supports beam-specific timing advance groups in accordance with aspects of the present disclosure.

FIG. 6 illustrates an example of a process flow 600 that supports beam-specific timing advance groups in accordance with various aspects of the present disclosure. In some examples, process flow 600 may implement aspects of wireless communications system 100. Process flow 600 may be implemented by a base station 105-e and a UE 115-d, which may be examples of the corresponding devices described with reference to FIGS. 1-5.

At 605, UE 115-d may send an uplink transmission to base station 105-e. The uplink transmission may include a measurement report for one or more BPLs of a set of BPLs (e.g., one or more beams or a set of beams in other examples), a reference signal using one or more BPLs of the set of BPLs, or an indication of a capability of UE 115-d to support beam TAGs, or a combination thereof. The indication of a capability may include one or more of the following how many beam TAGs the UE 115-d can support, whether UE 115-d can support any of the mentioned cases and corresponding procedures described with reference to FIGS. 3-5, beam reciprocity capability, MPE configurations, radio frequency and digital processing capabilities, or antenna subarray support and configuration.

At 610, base station 105-e may identify a beam TAG comprising a set of BPLs. The set of BPLs may be used for communications between base station 105-e and UE 115-d. Base station 105-e may identify the beam TAG based at least in part on a received uplink transmission from UE 115-d at 605. For example, base station 105-e may receive a capabilities indication which provides that UE 115-d is capable of receiving multiple TA commands, and may configure the beam TAG based on the capabilities indication. Base station 105-e may similarly identify or form a beam TAG based on any of the information received via an uplink transmission at 605.

At 615, UE 115-d may receive, from base station 105-e, a TA command for a beam TAG comprising a set of BPLs. The set of BPLs may be used for communications between UE 115-d and base station 105-e. The TA command for the beam TAG may be based at least in part on a common timing reference value. In some examples, the TA command for the beam TAG may include a set of TA commands, each TA command of the set of TA commands corresponding to one or more BPLs of the set of BPLs. In other examples, the TA command may include an identifier providing a correspondence between a TA value of the TA command and a BPL of the set of BPLs. In some examples, each BPL of the set of BPLs may be quasi co-located with each other BPL of the set of BPLs. For example, each BPL may be spatially quasi co-located, or quasi co-located with respect to different parameters such as delay, delay spread, Doppler shift, or Doppler spread. In some examples, UE 115-d may determine that a timing alignment timer has expired based at least in part on identifying that a second TA command has not been received during a predetermined duration. The timing alignment timer may correspond to a BPL of the set of BPLs, or the beam TAG, or a combination thereof.

In some examples, base station 105-e may transmit a TA command with a common TA value for a set of BPLs. Base station 105-e may transmit the TA command based at least in part on a common timing reference value. Base station 105-e may transmit the TA command with a set of BPL-specific TA values for respective BPLs of the set of BPLs. In some examples, base station 105-e may transmit the TA command with a common TA value corresponding to each BPL of the set of BPLs, and with a set of BPL-specific offsets from the common TA value, the set of BPL-specific offsets for respective BPLs of the set of BPLs. Base station 105-*e* may transmit an indication of one or more BPLs of the set of BPLs that UE 115-*d* may use to determine a common timing reference value. In some examples, base station 105-*e* may transmit a BPL-specific offset value for one or more BPLs of the set of BPLs in the TA command, or a RAR, or a MAC CE, or an RRC message, or a combination thereof.

In some examples, base station 105-*e* may determine a timing alignment timer corresponding to a BPL of the set of BPLs, or the beam TAG, or a combination thereof, wherein transmitting the TA command may be based at least in part on the timing alignment timer. In other examples, base station 105-*e* may determine that one or more BPLs of the set of BPLs may be operating above a maximum transmission timing difference for the set of BPLs, wherein transmitting the TA command is based at least in part on the determining. The BPL operating above the maximum transmission timing difference may correspond to the beam TAG, or correspond to a second beam TAG. In some examples, each BPL of the set of BPLs may be quasi co-located with each other BPL of the set of BPLs. For example, each BPL may be spatially quasi co-located, or quasi co-located with respect to different parameters such as delay, delay spread, Doppler shift, or Doppler spread.

At 620, UE 115-*d* may identify a common timing reference value for the beam TAG. The common timing reference value may be identified based at least in part on one of a single BPL of the set of BPLs, or multiple BPLs of the set of BPLs. In some examples, the common timing reference value may be identified based at least in part on a function of reception timings across the set of BPLs at a time. Additionally or alternatively, the common timing reference value may be identified based at least in part on a function of the reception timings across the set of BPLs over a duration of time, where the function may be one of an average value or an earliest value among the multiple reception timings. In other examples, identifying the common timing reference value may include identifying a BPL of the set of BPLs as a reference BPL, and identifying the common reference timing value based at least in part on the identified reference BPL. Identifying a BPL as a reference BPL may include identifying a BPL having received and applied a prior TA command more recently than any other BPL in the set of BPLs. Identifying the BPL as a reference BPL may further include receiving an indication from base station 105-*e* identifying the reference BPL.

In some examples, base station 105-*e* may identify a common timing reference value for the set of BPLs of the identified beam TAG. In some examples, the common timing reference value may be identified by the base station 105-*e* based on similar factors as for UE 115-*d*. For example, the common timing reference value may be based on a function of reception timings across the set of BPLs at a time, or a function of the reception timings across the set of BPLs over a duration of time, such as an average value or an earliest value among the multiple reception timings.

At 625, UE 115-*d* may determine a TA value for the beam TAG based at least in part on the TA command. Determining a TA value may be based at least in part on the identified common timing reference value and a common TA value for the set of BPLs received in the TA command. Determining a TA value may be based at least in part on the identified common timing reference value and a set of BPL-specific TA values for respective BPLs of the set of BPLs received in the TA command. Determining a TA value may be based at least in part on the identified common timing reference value and a common TA value corresponding to each BPL of the set of BPLs, and with a set of BPL-specific offsets from the common TA value received in the TA command, the set of BPL-specific offsets for respective BPLs of the set of BPLs. In some examples, UE 115-*e* may compare a reception timing of one of the set of BPLs and the reception timing of a reference BPL, and determine a BPL-specific TA offset value based at least in part on the comparison. In other examples, UE 115-*e* may receive a BPL-specific offset value for one or more BPLs of the set of BPLs in the TA command, or a RAR, or a MAC CE, or an RRC message, or a combination thereof.

At 630, UE 115-*d* may adjust a communication timing for one or more of the set of BPLs based at least in part on the identified common timing reference value and the determined TA value. In some examples, UE 115-*d* may identify one or more TA constraints on the TA command, wherein the adjusting the transmission timing may be based at least in part on the constraints. The TA constraints may include, for example, a maximum magnitude of change in one adjustment or a maximum magnitude of change over a predetermined duration. In some examples, a first set of TA constraints may apply to the set of BPLs of the beam TAG, and a second set of TA constraints may apply to BPLs of a second beam TAG.

At 635, UE 115-*d* may transmit an uplink transmission with a new transmission timing, for example over two or more different BPLs, such that the new transmission timing may avoid collisions or interference between the transmissions when received at the base station 105-*e*.

Figure 7:
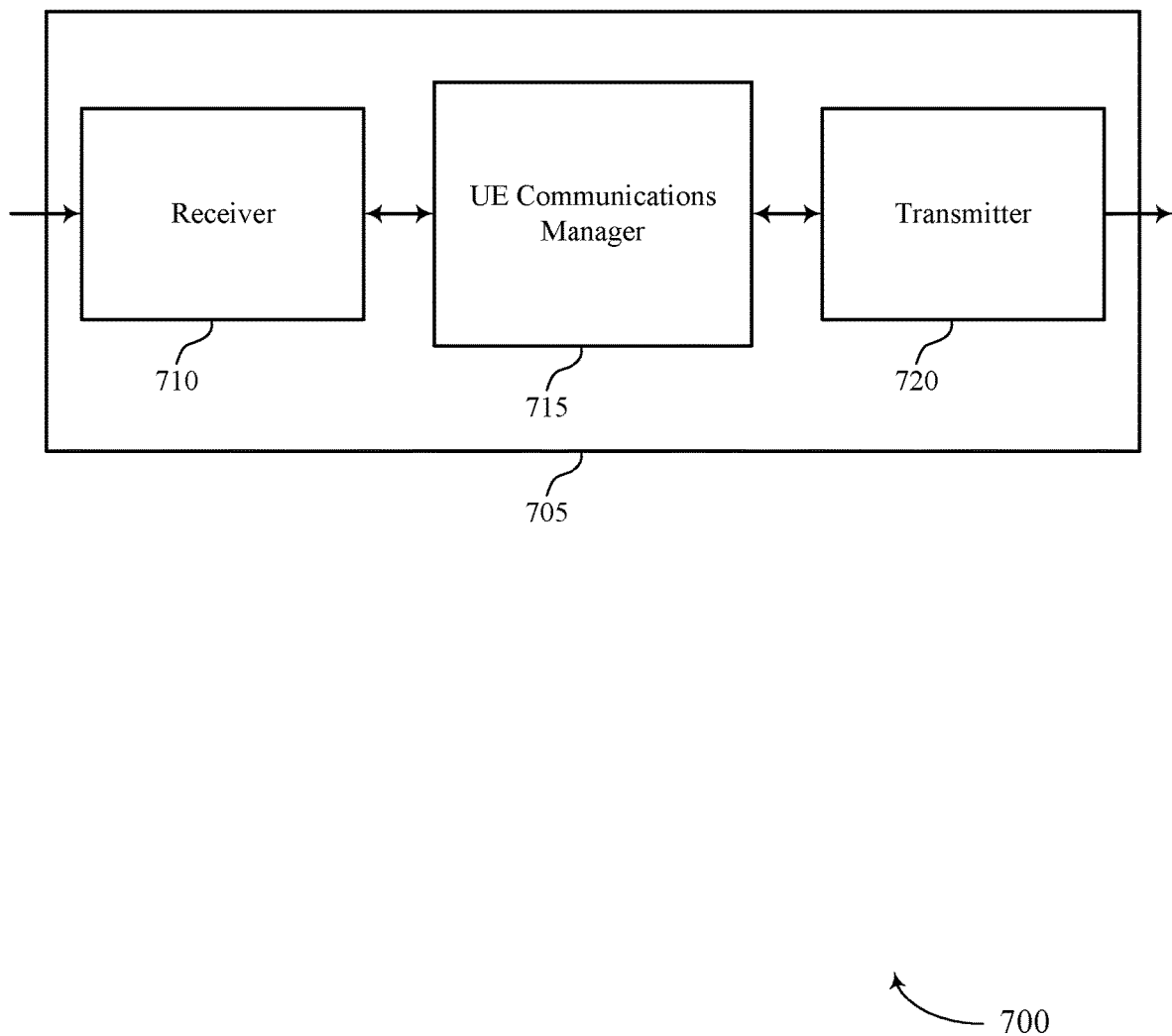
FIGS. 7 through 9 show block diagrams of a device that supports beam-specific timing advance groups in accordance with aspects of the present disclosure.

FIG. 7 shows a block diagram 700 of a wireless device 705 that supports beam-specific timing advance groups in accordance with aspects of the present disclosure. Wireless device 705 may be an example of aspects of a UE 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to beam-specific timing advance groups, etc.). Information may be passed on to other components of the device. The receiver 710 may be an example of aspects of the transceiver 1035 described with reference to FIG. 10. The receiver 710 may utilize a single antenna or a set of antennas.

UE communications manager 715 may be an example of aspects of the UE communications manager 1015 described with reference to FIG. 10.

UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 715 and/or at least some of its various sub-components may be physically located at various positions, including being distributed such that portions of functions are implemented at different physical locations by one or more physical devices. In some examples, UE communications manager 715 and/or at least some of its various sub-components may be a separate and distinct component in accordance with various aspects of the present disclosure. In other examples, UE communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 715 may receive, from a second wireless node, a TA command for a beam TAG including a set of beams the set of beams used for communications between the first wireless node and at least one of the second wireless node or a third wireless node, identify a common timing reference value for the beam TAG, determine a TA value for the beam TAG based on the TA command, and adjust a communication timing for one or more of the set of beams based on the identified common timing reference value and the determined TA value.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
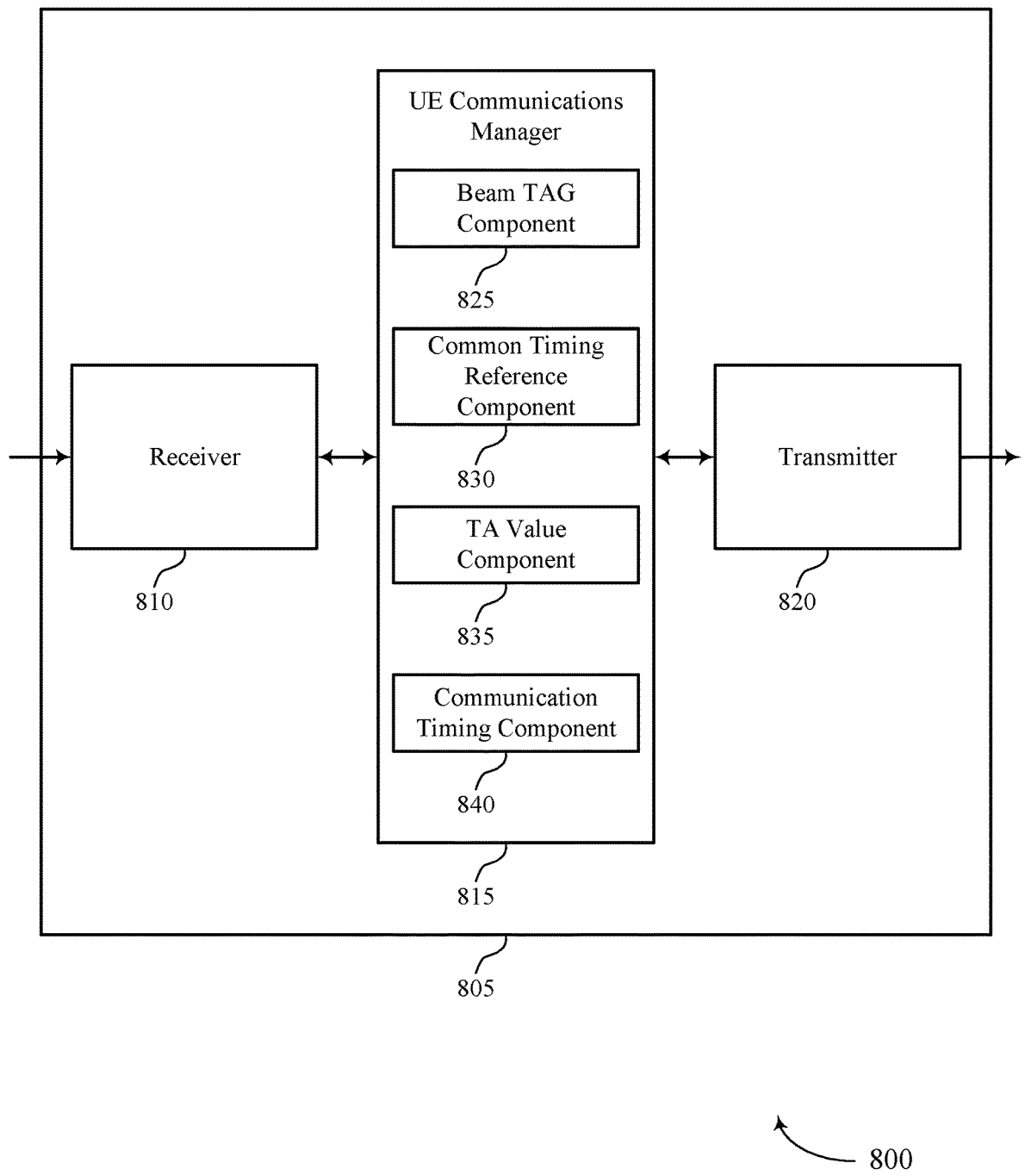

FIG. 8 shows a block diagram 800 of a wireless device 805 that supports beam-specific timing advance groups in accordance with aspects of the present disclosure. Wireless device 805 may be an example of aspects of a wireless device 705 or a UE 115 as described with reference to FIG. 7. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to beam-specific timing advance groups, etc.). Information may be passed on to other components of the device. The receiver 810 may be an example of aspects of the transceiver 1035 described with reference to FIG. 10. The receiver 810 may utilize a single antenna or a set of antennas.

UE communications manager 815 may be an example of aspects of the UE communications manager 1015 described with reference to FIG. 10.

UE communications manager 815 may also include beam TAG component 825, common timing reference component 830, TA value component 835, and communication timing component 840.

Beam TAG component 825 may receive, from a second wireless node, a TA command for a beam TAG including a set of beams, the set of beams used for communications between the first wireless node and at least one of the second wireless node or a third wireless node and transmit, to the second wireless node, a measurement report for one or more beams of the set of beams, a reference signal using one or more beams of the set of beams, or an indication of a capability of the first wireless node to support beam TAGs.

Common timing reference component 830 may identify a common timing reference value for the beam TAG, wherein identifying the common timing reference value for the set of beams is based on one of the set of beams, or multiple beams of the set of beams. Common timing reference component 830 may also identify the common reference timing value based on the identified reference beam, identify the common reference timing value is based on one of a function of the reception timings across the set of beams at a time, or a function of the reception timings across the set of beams over a duration of time. In some cases, identifying the common timing reference value includes identifying a beam of the set of beams as a reference beam. In some cases, the function is one of an average value or an earliest value among the multiple reception timings.

TA value component 835 may determine a TA value for the beam TAG based on the TA command. In some cases, determining the TA value for the beam TAG includes determining the TA value for the beam TAG based on the identified common timing reference value and a common TA value for the set of beams received in the TA command. In some cases, determining the TA value for the beam TAG includes determining the TA value for the beam TAG based on the identified common timing reference value and a set of beam-specific TA values for respective beams of the set of beams received in the TA command. In some cases, determining the TA value for the beam TAG includes determining the TA value for the beam TAG based on the identified common timing reference value and a common TA value corresponding to each beam of the set of beams, and with a set of beam-specific offsets from the common TA value received in the TA command, the set of beam-specific offsets for respective beams of the set of beams.

Communication timing component 840 may adjust a communication timing for one or more of the set of beams based on the identified common timing reference value and the determined TA value.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
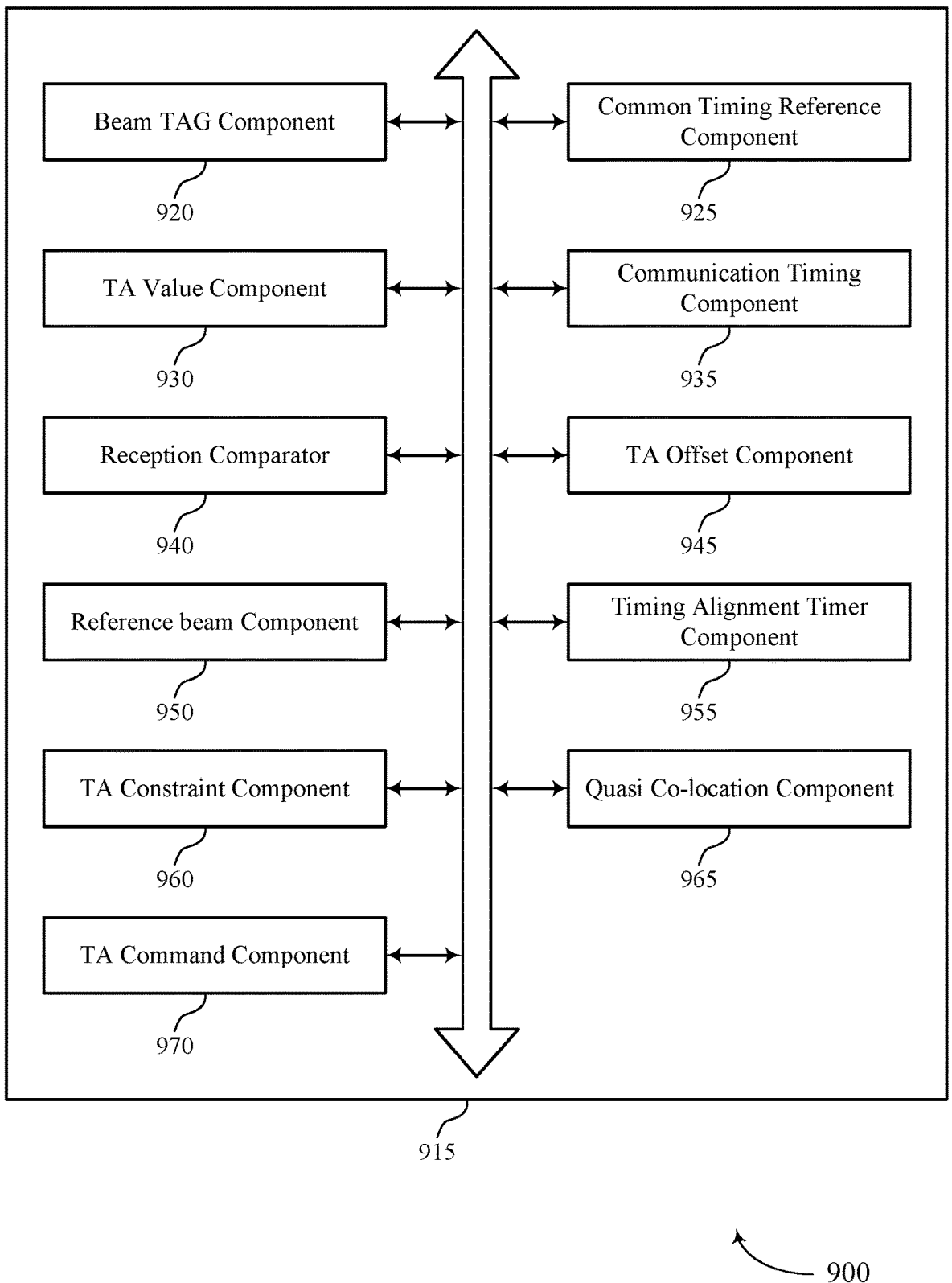

FIG. 9 shows a block diagram 900 of a UE communications manager 915 that supports beam-specific timing advance groups in accordance with aspects of the present disclosure. The UE communications manager 915 may be an example of aspects of a UE communications manager 715, a UE communications manager 815, or a UE communications manager 1015 described with reference to FIGS. 7, 8, and 10. The UE communications manager 915 may include beam TAG component 920, common timing reference component 925, TA value component 930, communication timing component 935, reception comparator 940, TA offset component 945, reference beam component 950, timing alignment timer component 955, TA constraint component 960, quasi co-location component 965, and TA command component 970. Each of these modules may communicate, directly or indirectly, with one another (e.g., via one or more buses).

Beam TAG component 920 may receive, from a second wireless node, a TA command for a beam timing advance group (TAG) including a set of beams, the set of BPLs used for communications between the first wireless node and at least one of the second wireless node or a third wireless node and transmit, to the second wireless node, a measurement report for one or more beams of the set of beams, a reference signal using one or more beams of the set of beams, or an indication of a capability of the first wireless node to support beam TAGs.

Common timing reference component 925 may identify a common timing reference value for the beam TAG, wherein identifying the common timing reference value for the set of beams is based on one of a single beam of the set of beams, or multiple beams of the set of beams. Common timing reference component 925 may also identify the common reference timing value based on the identified reference beam, identify the common reference timing value is based on one of a function of the reception timings across the set of beams at a time, or a function of the reception timings across the set of beams over a duration of time. In some cases, identifying the common timing reference value includes identifying a beam of the set of beams as a reference beam. In some cases, the function is one of an average value or an earliest value among the multiple reception timings.

TA value component 930 may determine a TA value for the beam TAG based on the TA command. In some cases, determining the TA value for the beam TAG includes determining the TA value for the beam TAG based on the identified common timing reference value and a common TA value for the set of beams received in the TA command. In some cases, determining the TA value for the beam TAG includes determining the TA value for the beam TAG based on the identified common timing reference value and a set of beam-specific TA values for respective beams of the set of beams received in the TA command. In some cases, determining the TA value for the beam TAG includes determining the TA value for the beam TAG based on the identified common timing reference value and a common TA value corresponding to each beam of the set of beams, and with a set of beam-specific offsets from the common TA value received in the TA command, the set of beam-specific offsets for respective beams of the set of beams.

Communication timing component 935 may adjust a communication timing for one or more of the set of beams based on the identified common timing reference value and the determined TA value.

Reception comparator 940 may compare a reception timing of one of the set of beams and the reception timing of a reference beam.

TA offset component 945 may determine a beam-specific TA offset value based on the comparison and receive a beam-specific offset value for one or more beams of the set of beams in the TA command, or a RAR, or a MAC CE, or an RRC message, or a combination thereof.

Reference beam component 950 may identify a beam as a reference beam, the reference beam having received and applied a prior TA command more recently than any other beam in the set of beams. In some cases, identifying the beam as a reference beam further includes receiving an indication from the second wireless node identifying the reference beam.

Timing alignment timer component 955 may determine that a timing alignment timer has expired based on identifying that a second TA command has not been received during a predetermined duration, the timing alignment timer corresponding to a beam of the set of beams, or the beam TAG, or a combination thereof.

TA constraint component 960 may identify one or more TA constraints on the TA command, where the adjusting the communication timing is based on the constraints. In some cases, the one or more TA constraints include a maximum magnitude of change in one adjustment or a maximum magnitude of change over a predetermined duration. In some cases, a first set of TA constraints applies to the set of beams of the beam TAG, and a second set of TA constraints applies to beams of a second beam TAG.

Quasi co-location component 965 may determine that the set of beams are quasi co-located with each other beam of the set of beams. Identifying the beam TAG may be based at least in part on the quasi co-location of the beams of the beam TAG.

TA command component 970 may generate a TA command for a beam TAG. A TA command for the beam TAG includes a set of TA commands, each TA command of the set of TA commands corresponding to one or more beams of the set of beams. In some cases, the TA command includes an identifier providing a correspondence between a TA value of the TA command and a beam of the set of beams.

Figure 10:
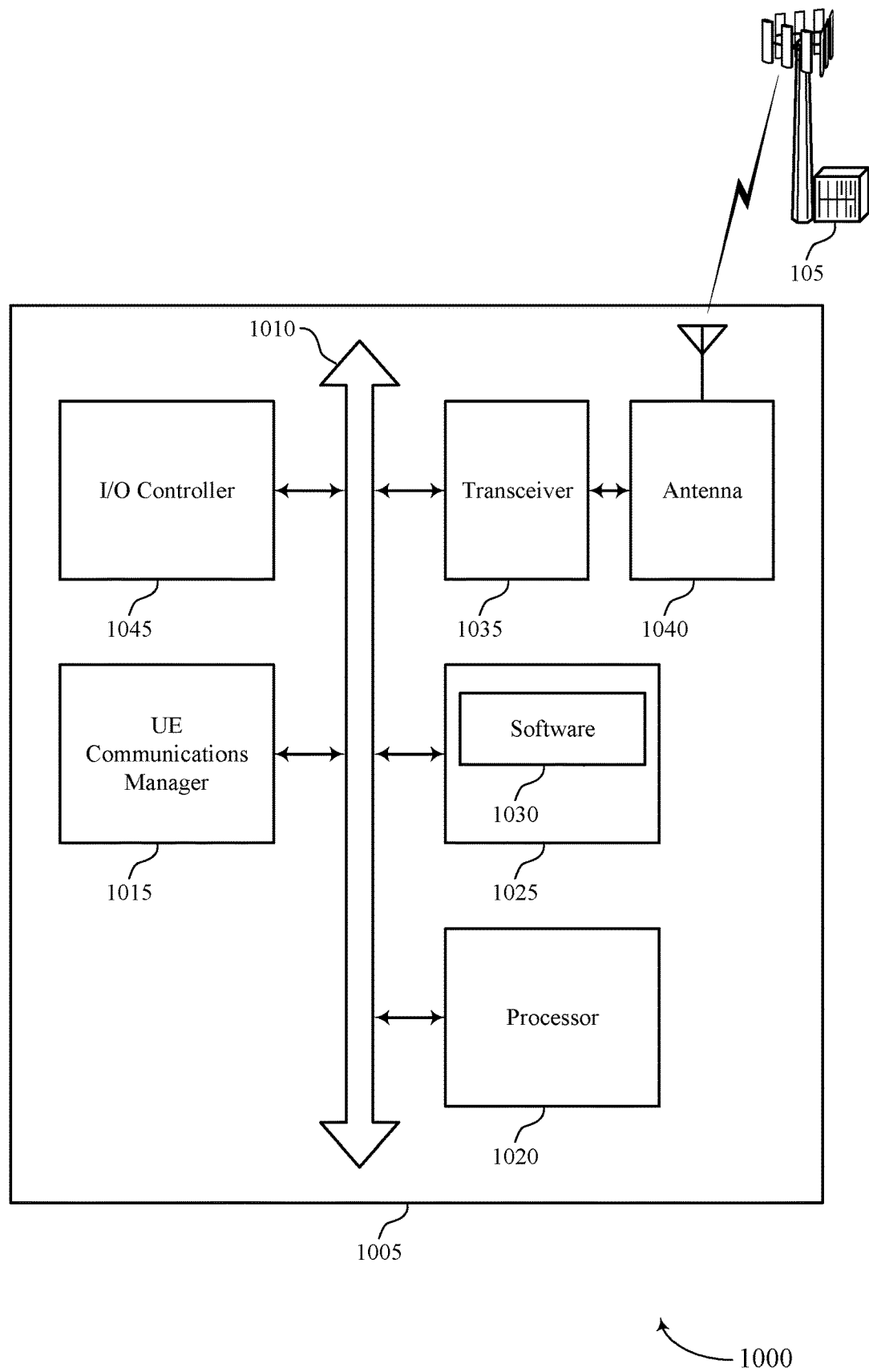
FIG. 10 illustrates a block diagram of a system including a user equipment (UE) that supports beam-specific timing advance groups in accordance with aspects of the present disclosure.

FIG. 10 shows a diagram of a system 1000 including a device 1005 that supports beam-specific timing advance groups in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting beam-specific timing advance groups).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support beam-specific timing advance groups. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
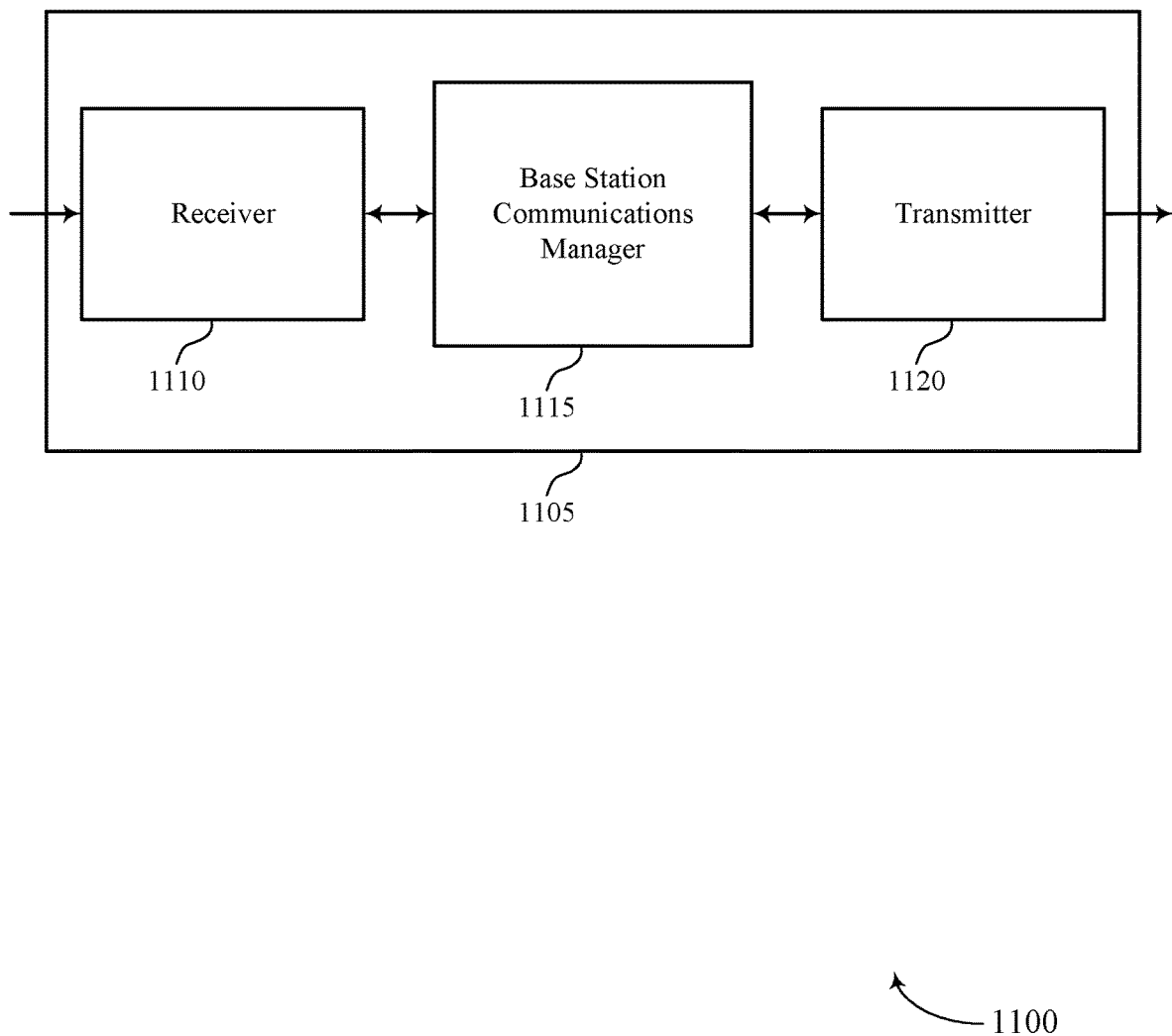
FIGS. 11 through 13 show block diagrams of a device that supports beam-specific timing advance groups in accordance with aspects of the present disclosure.

FIG. 11 shows a block diagram 1100 of a wireless device 1105 that supports beam-specific timing advance groups in accordance with aspects of the present disclosure. Wireless device 1105 may be an example of aspects of a base station 105 as described herein. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to beam-specific timing advance groups, etc.). Information may be passed on to other components of the device. The receiver 1110 may be an example of aspects of the transceiver 1435 described with reference to FIG. 14. The receiver 1110 may utilize a single antenna or a set of antennas.

Base station communications manager 1115 may be an example of aspects of the base station communications manager 1415 described with reference to FIG. 14.

Base station communications manager 1115 and/or at least some of its various sub-components may be implemented in hardware, software executed by a processor, firmware, or any combination thereof. If implemented in software executed by a processor, the functions of the base station communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1115 and/or at least some of its various sub-components may be physically located at various positions, including being distributed such that portions of functions are implemented at different physical locations by one or more physical devices. In some examples, base station communications manager 1115 and/or at least some of its various sub-components may be a separate and distinct component in accordance with various aspects of the present disclosure. In other examples, base station communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1115 may identify a beam timing advance group (TAG) including a set of beams, the set of beams used for communications between a second wireless node and at least one of the first wireless node or a third wireless node, identify a common timing reference value for the set of beams of the identified beam TAG, and transmit a TA command for the beam TAG based on the common timing reference value.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
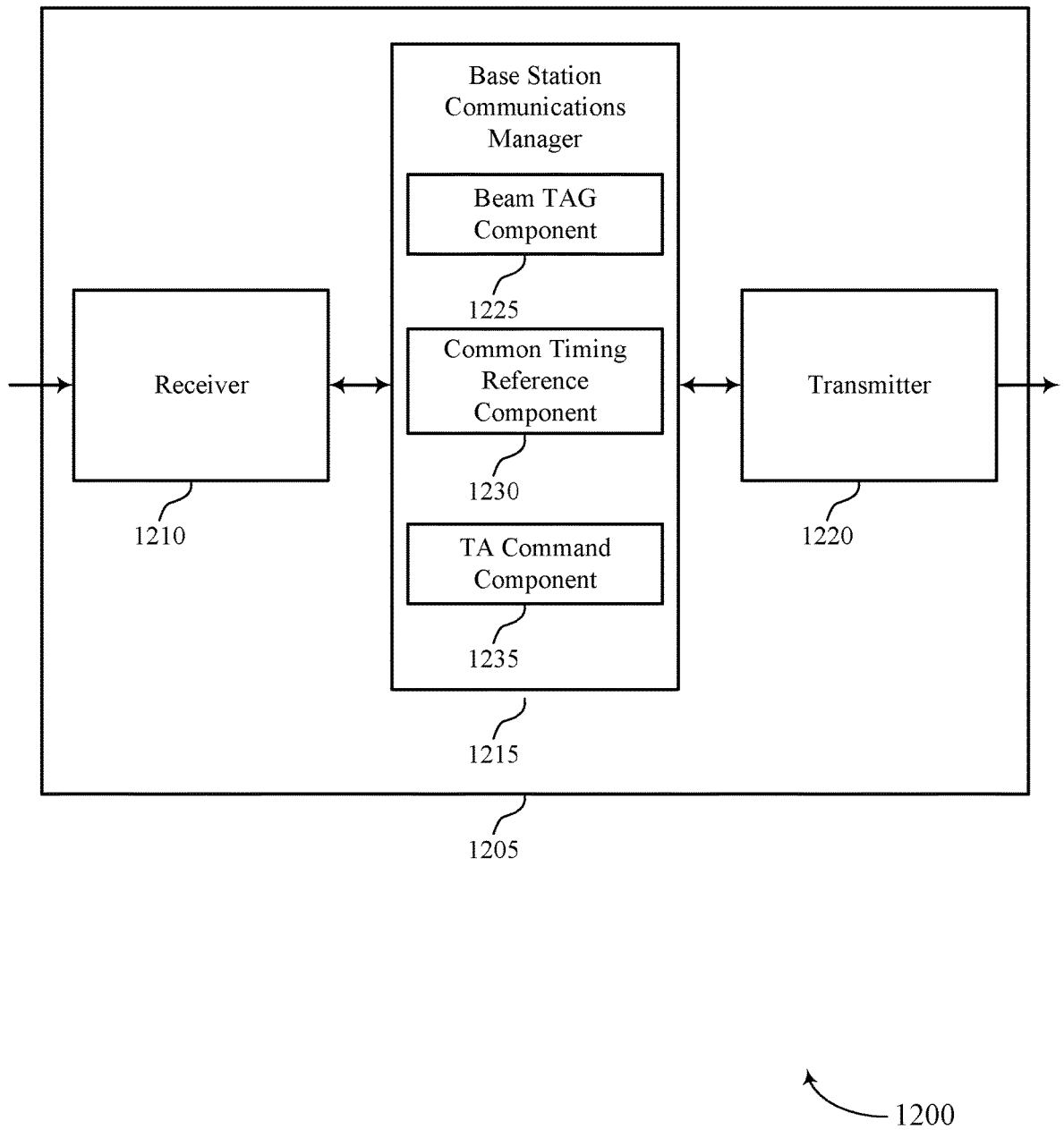

FIG. 12 shows a block diagram 1200 of a wireless device 1205 that supports beam-specific timing advance groups in accordance with aspects of the present disclosure. Wireless device 1205 may be an example of aspects of a wireless device 1105 or a base station 105 as described with reference to FIG. 11. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to beam-specific timing advance groups, etc.). Information may be passed on to other components of the device. The receiver 1210 may be an example of aspects of the transceiver 1435 described with reference to FIG. 14. The receiver 1210 may utilize a single antenna or a set of antennas.

Base station communications manager 1215 may be an example of aspects of the base station communications manager 1415 described with reference to FIG. 14.

Base station communications manager 1215 may also include beam TAG component 1225, common timing reference component 1230, and TA command component 1235.

Beam TAG component 1225 may identify the beam TAG based on the received transmission, identify a beam timing advance group (TAG) including a set of beams, the set of beams used for communications between a second wireless node and at least one of the first wireless node or a third wireless node, or a reference signal from the second wireless node using one or more beams of the set of beams, or an indicator of a capability of the second wireless node to support beam TAGs, or a combination thereof. In some cases, identifying the beam TAG includes receiving a transmission from the second wireless node. In some cases, the received transmission includes a report of measurements by the second wireless device for one or more beams of the set of beams.

Common timing reference component 1230 may identify a common timing reference value for the set of beams of the identified beam TAG, transmit an indication of one or more beams of the set of beams that the second wireless node is to use to determine the common timing reference value, identify the common reference timing value is based on a function of reception timings across the set of beams at a time, or a function of reception timings across the set of beams over a duration of time. In some cases, the function is one of an average value or an earliest value among the multiple reception timings.

TA command component 1235 may transmit a TA command for the beam TAG based on the common timing reference value and determine that one or more beams of the set of beams are operating above a maximum transmission timing difference for the set of beams, where transmitting the TA command is based on the determining. In some cases, transmitting the TA command for the beam TAG further includes transmitting the TA command with a common TA value for the set of beams. In some cases, transmitting the TA command for the beam TAG further includes transmitting the TA command with a set of beam-specific TA values for respective beams of the set of beams. In some cases, transmitting the TA command for the beam TAG further includes transmitting the TA command with a common TA value corresponding to each beam of the set of beams, and with a set of beam-specific offsets from the common TA value, the set of beam-specific offsets for respective beams of the set of beams. In some cases, the beam operating above the maximum transmission timing difference corresponds to the beam TAG, or corresponds to a second beam TAG.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
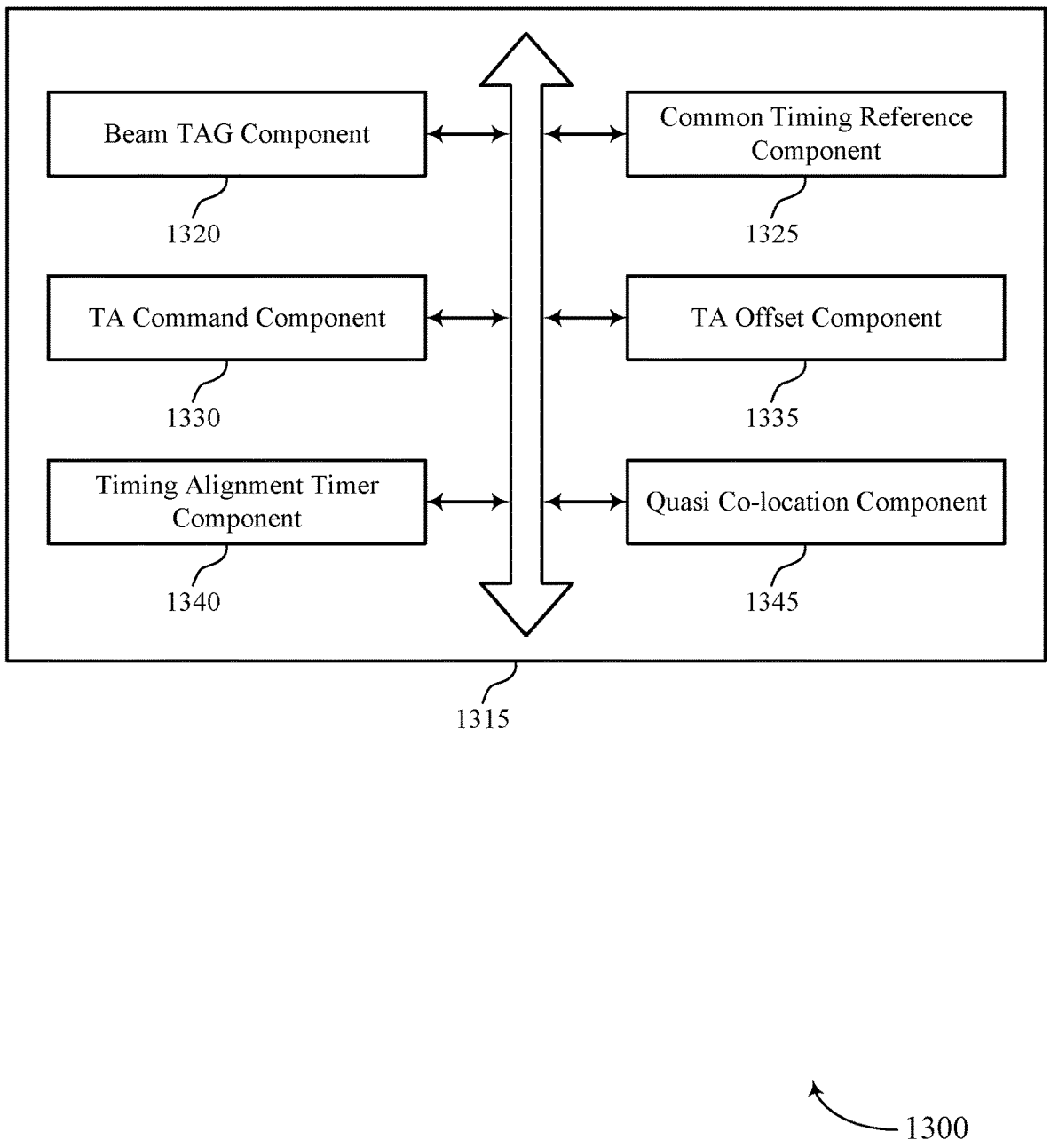

FIG. 13 shows a block diagram 1300 of a base station communications manager 1315 that supports beam-specific timing advance groups in accordance with aspects of the present disclosure. The base station communications manager 1315 may be an example of aspects of a base station communications manager 1415 described with reference to FIGS. 11, 12, and 14. The base station communications manager 1315 may include beam TAG component 1320, common timing reference component 1325, TA command component 1330, TA offset component 1335, timing alignment timer component 1340, and quasi co-location component 1345. Each of these modules may communicate, directly or indirectly, with one another (e.g., via one or more buses).

Beam TAG component 1320 may identify the beam TAG based on the received transmission, identify a beam timing advance group (TAG) including a set of beams, the set of beams used for communications between a second wireless node and at least one of the first wireless node or a third wireless node, or a reference signal from the second wireless node using one or more beams of the set of beams, or an indicator of a capability of the second wireless node to support beam TAGs, or a combination thereof. In some cases, identifying the beam TAG includes receiving a transmission from the second wireless node. In some cases, the received transmission includes a report of measurements by the second wireless device for one or more beams of the set of beams.

Common timing reference component 1325 may identify a common timing reference value for the set of beams of the identified beam TAG, transmit an indication of one or more beams of the set of beams that the second wireless node is to use to determine the common timing reference value, identify the common reference timing value is based on a function of reception timings across the set of beams at a time, or a function of reception timings across the set of beams over a duration of time. In some cases, the function is one of an average value or an earliest value among the multiple reception timings.

TA command component 1330 may transmit a TA command for the beam TAG based on the common timing reference value and determine that one or more beams of the set of beams are operating above a maximum transmission timing difference for the set of beams, where transmitting the TA command is based on the determining. In some cases, transmitting the TA command for the beam TAG further includes transmitting the TA command with a common TA value for the set of beams. In some cases, transmitting the TA command for the beam TAG further includes transmitting the TA command with a set of beam-specific TA values for respective beams of the set of beams. In some cases, transmitting the TA command for the beam TAG further includes transmitting the TA command with a common TA value corresponding to each beam of the set of beams, and with a set of beam-specific offsets from the common TA value, the set of beam-specific offsets for respective beams of the set of beams. In some cases, the beam operating above the maximum transmission timing difference corresponds to the beam TAG, or corresponds to a second beam TAG.

TA offset component 1335 may transmit a beam-specific offset value for one or more beams of the set of beams in the TA command, or a RAR, or a MAC CE, or an RRC message, or a combination thereof.

Timing alignment timer component 1340 may determine a timing alignment timer corresponding to a beam of the set of beams, or the beam TAG, or a combination thereof, where transmitting the TA command is based on the timing alignment timer.

Quasi co-location component 1345 may determine that the set of beams are quasi co-located with each other beam of the set of beams. Identifying the beam TAG may be based at least in part on the quasi co-location of the beams of the beam TAG.

Figure 14:
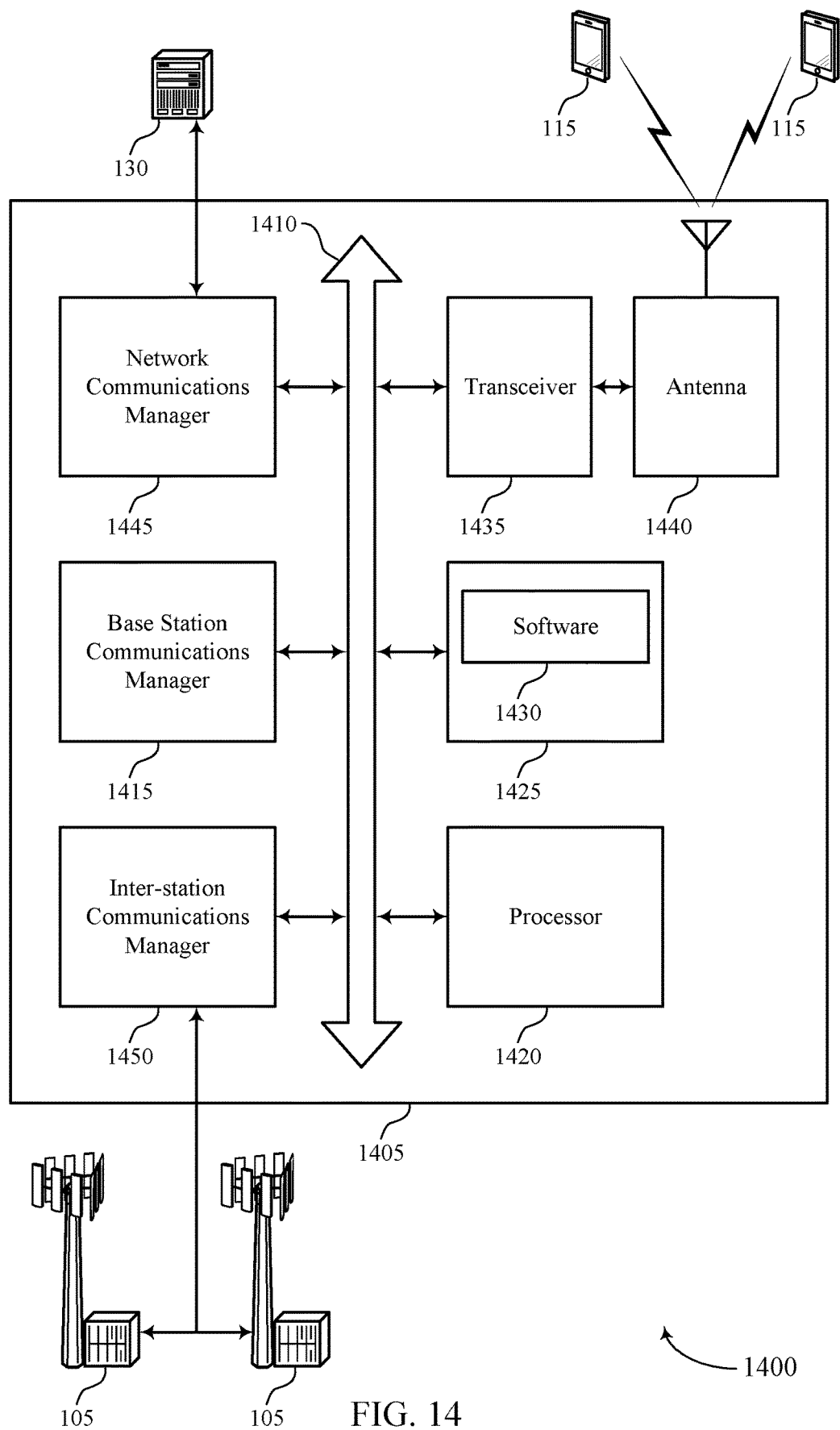
FIG. 14 illustrates a block diagram of a system including a base station that supports beam-specific timing advance groups in accordance with aspects of the present disclosure.

FIG. 14 shows a diagram of a system 1400 including a device 1405 that supports beam-specific timing advance groups in accordance with aspects of the present disclosure. Device 1405 may be an example of or include the components of base station 105 as described above, e.g., with reference to FIG. 1. Device 1405 may include components for bi-directional voice and data communications including components for transmitting and receiving communications, including base station communications manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting beam-specific timing advance groups).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support beam-specific timing advance groups. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an Long Term Evolution (LTE)/LTE-A wireless communication network technology to provide communication between base stations 105.

Figure 15:
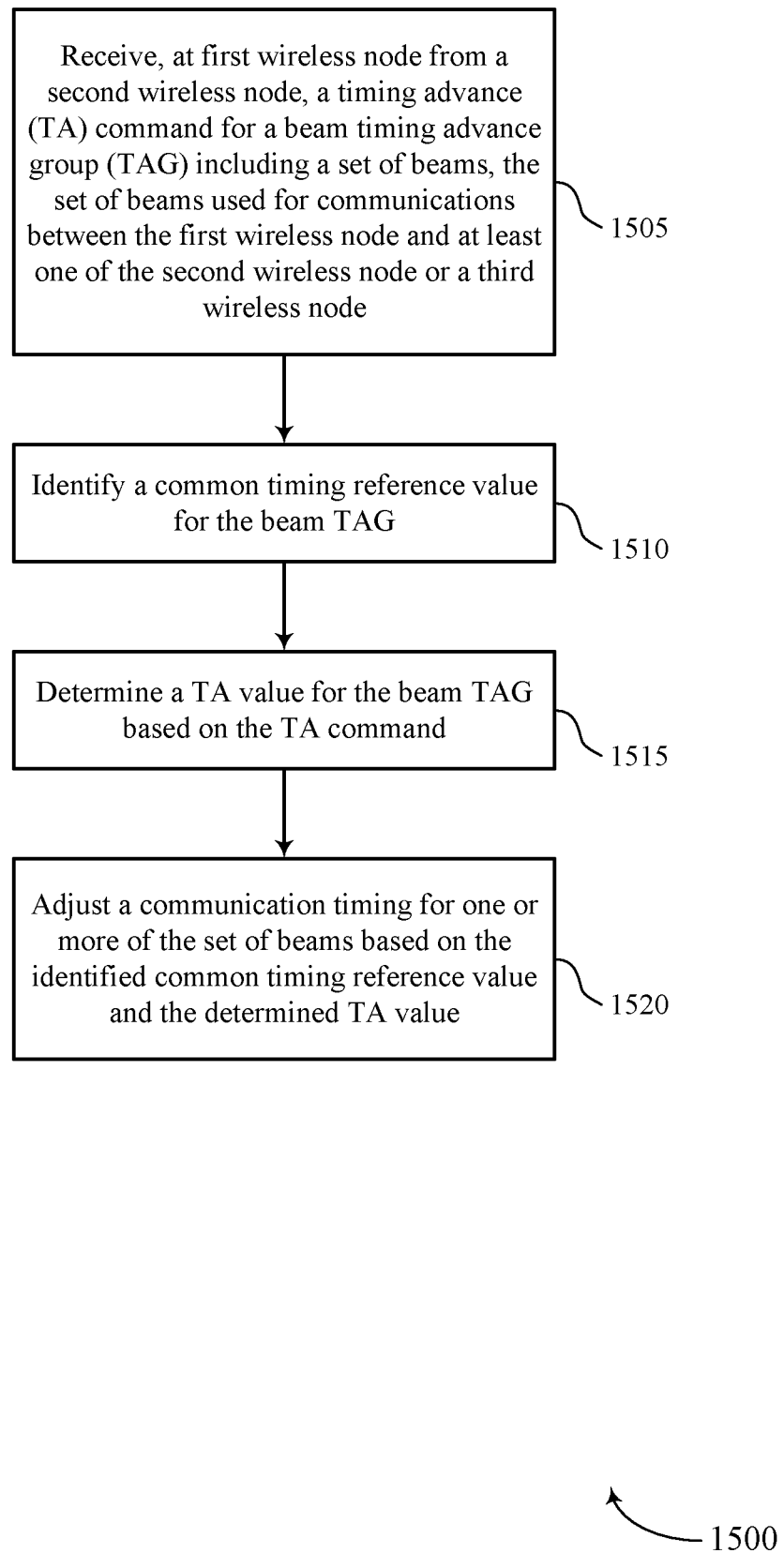
FIGS. 15 through 17 illustrate methods for beam-specific timing advance groups in accordance with aspects of the present disclosure.

FIG. 15 shows a flowchart illustrating a method 1500 for beam-specific timing advance groups in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive, from a second wireless node, a TA command for a beam timing advance group (TAG) comprising a set of beams, the set of beams used for communications between the first wireless node and at least one of the second wireless node or a third wireless node. The operations of 1505 may be performed according to the methods described herein. In certain examples, aspects of the operations of 1505 may be performed by a beam TAG component as described with reference to FIGS. 7 through 10.

At 1510 the UE 115 may identify a common timing reference value for the beam TAG. The operations of 1510 may be performed according to the methods described herein. In certain examples, aspects of the operations of 1510 may be performed by a common timing reference component as described with reference to FIGS. 7 through 10.

At 1515 the UE 115 may determine a TA value for the beam TAG based at least in part on the TA command. The operations of 1515 may be performed according to the methods described herein. In certain examples, aspects of the operations of 1515 may be performed by a TA value component as described with reference to FIGS. 7 through 10.

At 1520 the UE 115 may adjust a communication timing for one or more of the set of beams based at least in part on the identified common timing reference value and the determined TA value. The operations of 1520 may be performed according to the methods described herein. In certain examples, aspects of the operations of 1520 may be performed by a communication timing component as described with reference to FIGS. 7 through 10.

Figure 16:
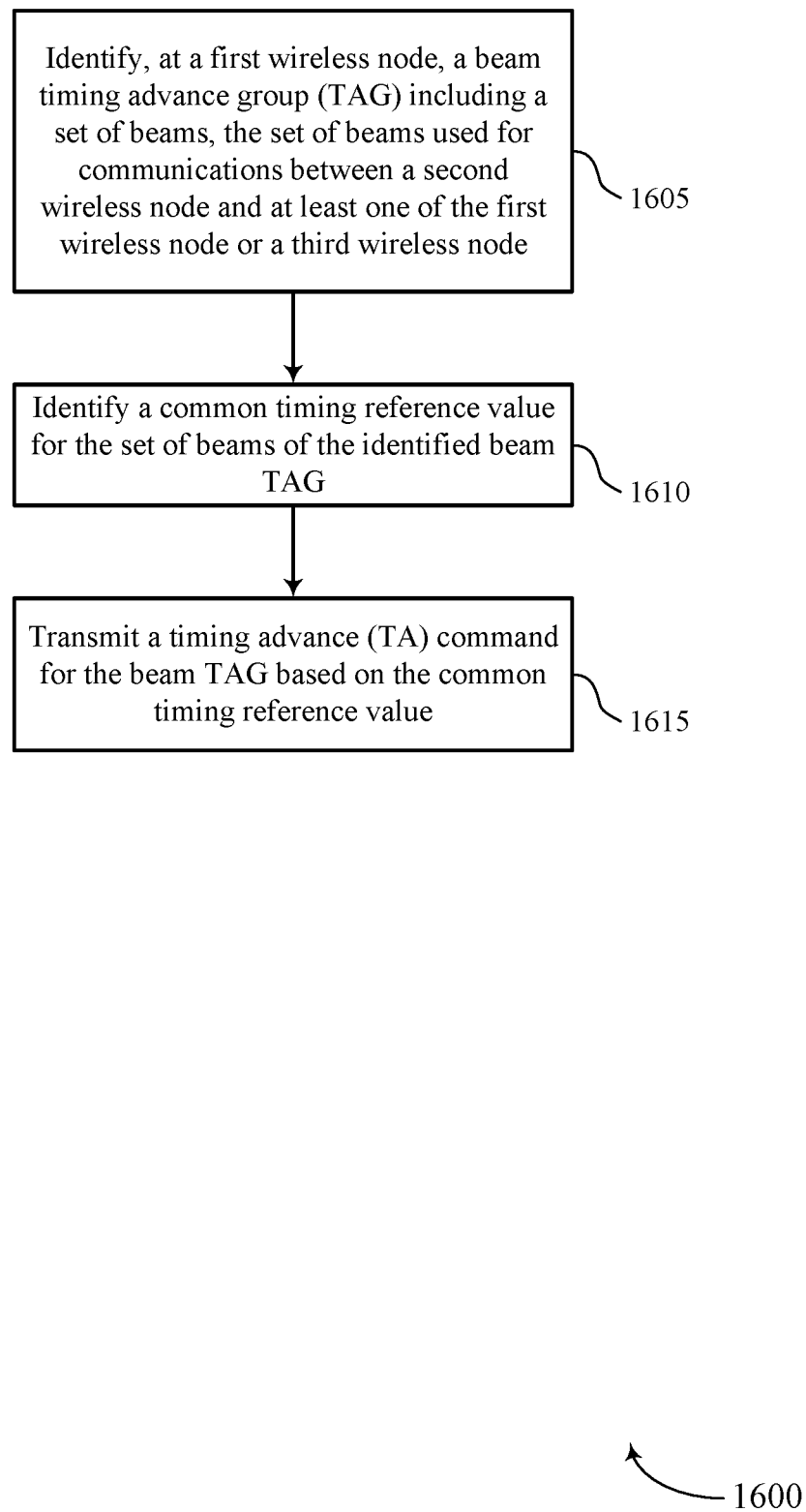

FIG. 16 shows a flowchart illustrating a method 1600 for beam-specific timing advance groups in accordance with aspects of the present disclosure. The operations of method 1600 may be implemented by a base station 105 or its components as described herein. For example, the operations of method 1600 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may identify a beam timing advance group (TAG) comprising a set of beams, the set of beams used for communications between a second wireless node and at least one of the first wireless node or a third wireless node. The operations of 1605 may be performed according to the methods described herein. In certain examples, aspects of the operations of 1605 may be performed by a beam TAG component as described with reference to FIGS. 11 through 14.

At 1610 the base station 105 may identify a common timing reference value for the set of beams of the identified beam TAG. The operations of 1610 may be performed according to the methods described herein. In certain examples, aspects of the operations of 1610 may be performed by a common timing reference component as described with reference to FIGS. 11 through 14.

At 1615 the base station 105 may transmit a TA command for the beam TAG based at least in part on the common timing reference value. The operations of 1615 may be performed according to the methods described herein. In certain examples, aspects of the operations of 1615 may be performed by a TA command component as described with reference to FIGS. 11 through 14.

Figure 17:
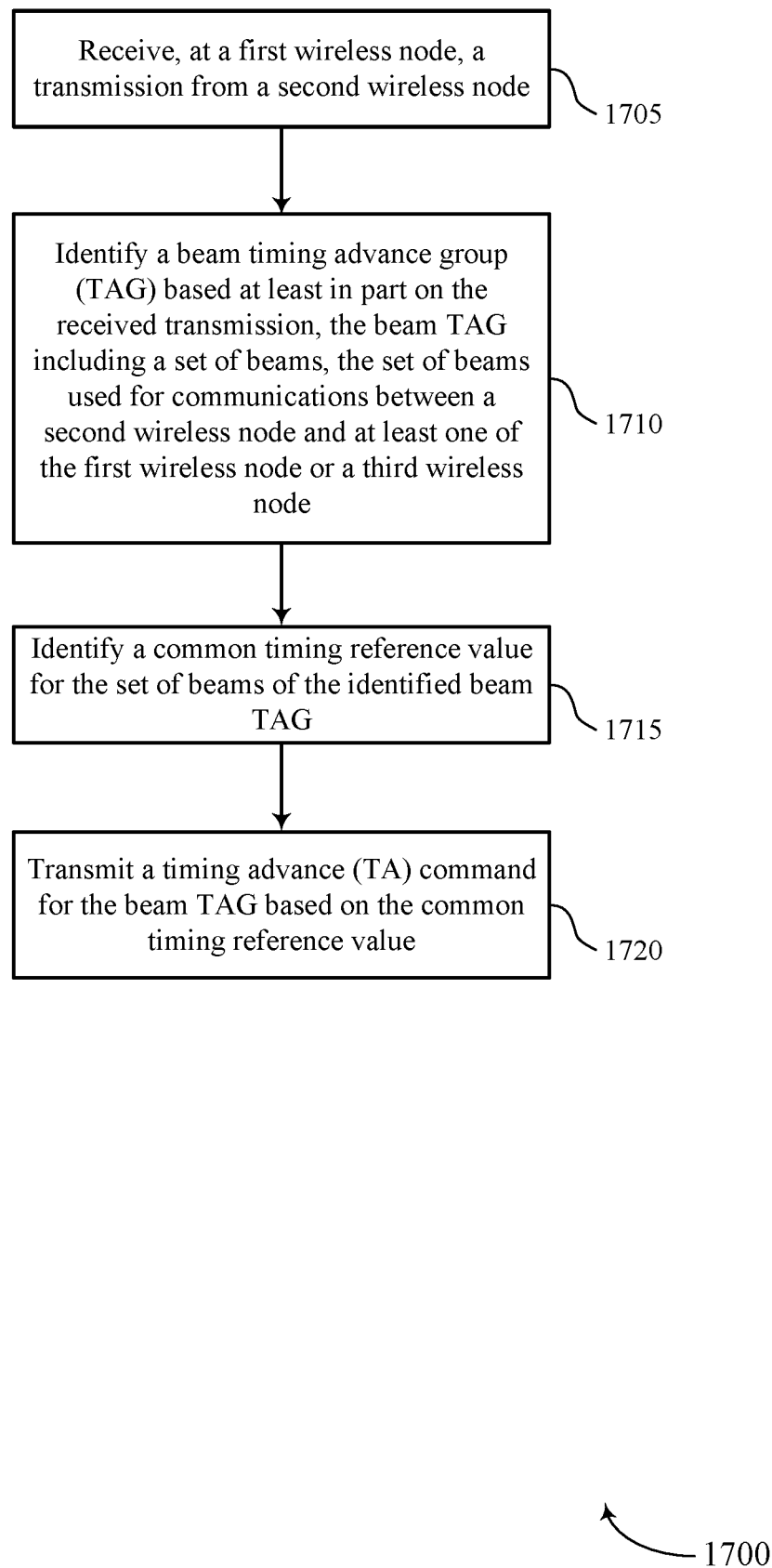

FIG. 17 shows a flowchart illustrating a method 1700 for beam-specific timing advance groups in accordance with aspects of the present disclosure. The operations of method 1700 may be implemented by a base station 105 or its components as described herein. For example, the operations of method 1700 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may receive a transmission from a second wireless node. The operations of 1705 may be performed according to the methods described herein. In certain examples, aspects of the operations of 1705 may be performed by a beam TAG component as described with reference to FIGS. 11 through 14.

At 1710 the base station 105 may identify a beam timing advance group (TAG) based at least in part on the received transmission, the beam TAG comprising a set of beams, the set of beams used for communications between a second wireless node and at least one of the first wireless node or a third wireless node. The operations of 1710 may be performed according to the methods described herein. In certain examples, aspects of the operations of 1710 may be performed by a beam TAG component as described with reference to FIGS. 11 through 14. In some cases, identifying the beam TAG comprises receiving a transmission from the second wireless node.

At 1715 the base station 105 may identify a common timing reference value for the set of beams of the identified beam TAG. The operations of 1715 may be performed according to the methods described herein. In certain examples, aspects of the operations of 1715 may be performed by a common timing reference component as described with reference to FIGS. 11 through 14.

At 1720 the base station 105 may transmit a TA command for the beam TAG based at least in part on the common timing reference value. The operations of 1720 may be performed according to the methods described herein. In certain examples, aspects of the operations of 1720 may be performed by a TA command component as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random access memory (RAM), read only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless node, comprising:
   receiving, from a second wireless node, a timing advance (TA) command for a beam timing advance group (TAG) comprising a set of beam pair links (BPLs) that each include a set of beams associated with the first wireless node, the set of beams used for communications between the first wireless node and at least one of the second wireless node or a third wireless node, wherein each BPL includes a transmit beam of the first wireless node and a receive beam of the second wireless node or the third wireless node;
   identifying a common timing reference value for the beam TAG;
   determining a TA value for the beam TAG based at least in part on the TA command, the identified common timing reference value, and a common TA value corresponding to each beam of the set of beams, and with a set of beam-specific offsets from the common TA value received in the TA command, the set of beam-specific offsets for respective beams of the set of beams; and
   adjusting a communication timing for one or more of the set of beams based at least in part on the identified common timing reference value and the determined TA value.

2. The method of claim 1, wherein determining the TA value for the beam TAG comprises:
   determining the TA value for the beam TAG based at least in part on a set of beam-specific TA values for respective beams of the set of beams received in the TA command.

3. The method of claim 1, further comprising:
   comparing a reception timing of one of the set of beams and the reception timing of a reference beam; and
   determining a beam-specific TA offset value based at least in part on the comparison.

4. The method of claim 1, further comprising:
   receiving a beam-specific offset value for one or more beams of the set of beams in the TA command, or a random access response (RAR), or a media access control (MAC) control element (CE), or an RRC message, or a combination thereof.

5. The method of claim 1, wherein identifying the common timing reference value for the set of beams is based at least in part on one of a single beam of the set of beams, or multiple beams of the set of beams.

6. The method of claim 1, wherein identifying the common timing reference value comprises:
   identifying a beam of the set of beams as a reference beam; and
   identifying the common reference timing value based at least in part on the identified reference beam.

7. The method of claim 6, wherein identifying the beam as a reference beam further comprises:
   identifying a beam having received and applied a prior TA command more recently than any other beam in the set of beams.

8. The method of claim 6, wherein identifying the beam as a reference beam further comprises:
   receiving an indication from the second wireless node identifying the reference beam.

9. The method of claim 1, wherein identifying the common reference timing value is based at least in part on one of:
   a function of the reception timings across the set of beams at a time; or
   a function of the reception timings across the set of beams over a duration of time.

10. The method of claim 9, wherein the function is one of an average value or an earliest value among the multiple reception timings.

11. The method of claim 1, further comprising:
    determining that a timing alignment timer has expired based at least in part on identifying that a second TA command has not been received during a predetermined duration, the timing alignment timer corresponding to a beam of the set of beams, or the beam TAG, or a combination thereof.

12. The method of claim 1, further comprising:
    identifying one or more TA constraints on the TA command, wherein the adjusting the communication timing is based at least in part on the constraints.

13. The method of claim 12, wherein the one or more TA constraints comprise a maximum magnitude of change in one adjustment or a maximum magnitude of change over a predetermined duration.

14. The method of claim 12, wherein a first set of TA constraints applies to the set of beams of the beam TAG, and a second set of TA constraints applies to beams of a second beam TAG.

15. The method of claim 1, further comprising:
    transmitting, to the second wireless node, a measurement report for one or more beams of the set of beams, a reference signal using one or more beams of the set of beams, or an indication of a capability of the first wireless node to support beam TAGS.

16. The method of claim 1, wherein each beam of the set of beams are quasi co-located with each other beam of the set of beams.

17. The method of claim 1, wherein the TA command for the beam TAG comprises a set of TA commands, each TA command of the set of TA commands corresponding to one or more beams of the set of beams.

18. The method of claim 1, wherein the TA command comprises an identifier providing a correspondence between a TA value of the TA command and a beam of the set of beams.

19. A method for wireless communication at a first wireless node, comprising:
    identifying a beam timing advance group (TAG) comprising a set of beam pair links (BPLs) that each include a set of beams associated with the first wireless node, the set of beams used for communications between a second wireless node and at least one of the first wireless node or a third wireless node, wherein each BPL includes a transmit beam of the first wireless node and a receive beam of the second wireless node or the third wireless node;
    identifying a common timing reference value for the set of beams of the identified beam TAG; and
    transmitting a timing advance (TA) command for the beam TAG based at least in part on the common timing reference value, wherein the TA command further comprises a common TA value corresponding to each beam of the set of beams and a set of beam-specific offsets from the common TA value, the set of beam-specific offsets for respective beams of the set of beams.

20. The method of claim 19, wherein transmitting the TA command for the beam TAG further comprises:
    transmitting the TA command with a set of beam-specific TA values for respective beams of the set of beams.

21. The method of claim 19, further comprising:
    transmitting an indication of one or more beams of the set of beams that the second wireless node is to use to determine the common timing reference value.

22. The method of claim 19, wherein identifying the beam TAG comprises:
    receiving a transmission from the second wireless node; and
    identifying the beam TAG based at least in part on the received transmission.

23. The method of claim 22, wherein the received transmission comprises:
    a report of measurements by the second wireless device for one or more beams of the set of beams; or
    a reference signal from the second wireless node using one or more beams of the set of beams; or
    an indicator of a capability of the second wireless node to support beam TAGs; or
    a combination thereof.

24. The method of claim 19, further comprising:
    transmitting a beam-specific offset value of the beam-specific offsets for one or more beams of the set of beams in the TA command, or a random access response (RAR), or a media access control (MAC) control element (CE), or an RRC message, or a combination thereof.

25. The method of claim 19, further comprising:
    identifying the common reference timing value is based at least in part on:
       a function of reception timings across the set of beams at a time; or
       a function of reception timings across the set of beams over a duration of time.

26. The method of claim 25, wherein the function is one of an average value or an earliest value among the multiple reception timings.

27. The method of claim 19, further comprising:
    determining a timing alignment timer corresponding to a beam of the set of beams, or the beam TAG, or a combination thereof, wherein transmitting the TA command is based at least in part on the timing alignment timer.

28. The method of claim 19, further comprising:
    determining that one or more beams of the set of beams are operating above a maximum transmission timing difference for the set of beams, wherein transmitting the TA command is based at least in part on the determining.

29. The method of claim 28, wherein the beam operating above the maximum transmission timing difference corresponds to the beam TAG, or corresponds to a second beam TAG.

30. The method of claim 19, wherein each beam of the set of beams are quasi co-located with each other beam of the set of beams.

31. An apparatus for wireless communication at a first wireless node, comprising:
    means for receiving, from a second wireless node, a timing advance (TA) command for a beam timing advance group (TAG) comprising a set of beam pair links (BPLs) that each include a set of beams associated with the first wireless node, the set of beams used for communications between the first wireless node and at least one of the second wireless node or a third wireless node, wherein each BPL includes a transmit beam of the first wireless node and a receive beam of the second wireless node or the third wireless node;
    means for identifying a common timing reference value for the beam TAG;
    means for determining a TA value for the beam TAG based at least in part on the TA command, the identified common timing reference value, and a common TA value corresponding to each beam of the set of beams, and with a set of beam-specific offsets from the common TA value received in the TA command, the set of beam-specific offsets for respective beams of the set of beams; and
    means for adjusting a communication timing for one or more of the set of beams based at least in part on the identified common timing reference value and the determined TA value.

32. An apparatus for wireless communication at a first wireless node, comprising:
    means for identifying a beam timing advance group (TAG) comprising a set of beam pair links (BPLs) that each include a set of beams associated with the first wireless node, the set of beams used for communications between a second wireless node and at least one of the first wireless node or a third wireless node, wherein each BPL includes a transmit beam of the first wireless node and a receive beam of the second wireless node or the third wireless node;
    means for identifying a common timing reference value for the set of beams of the identified beam TAG; and
    means for transmitting a timing advance (TA) command for the beam TAG based at least in part on the common timing reference value, wherein the TA command further comprises a common TA value corresponding to each beam of the set of beams and a set of beam-specific offsets from the common TA value, the set of beam-specific offsets for respective beams of the set of beams.

33. An apparatus for wireless communication at a first wireless node, comprising:
    a processor;
    memory coupled with the processor; and
    instructions stored in the memory and executable by the processor to cause the apparatus to:
        receive, from a second wireless node, a timing advance (TA) command for a beam timing advance group (TAG) comprising a set of beam pair links (BPLs) that each include a set of beams associated with the first wireless node, the set of beams used for communications between the first wireless node and at least one of the second wireless node or a third wireless node, wherein each BPL includes a transmit beam of the first wireless node and a receive beam of the second wireless node or the third wireless node;
        identify a common timing reference value for the beam TAG;
        determine a TA value for the beam TAG based at least in part on the TA command, the identified common timing reference value, and a common TA value corresponding to each beam of the set of beams, and with a set of beam-specific offsets from the common TA value received in the TA command, the set of beam-specific offsets for respective beams of the set of beams; and
        adjust a communication timing for one or more of the set of beams based at least in part on the identified common timing reference value and the determined TA value.

34. The apparatus of claim 33, wherein the instructions to determine the TA value for the beam TAG are executable by the processor to cause the apparatus to:
    determine the TA value for the beam TAG based at least in part on a set of beam-specific TA values for respective beams of the set of beams received in the TA command.

35. An apparatus for wireless communication at a first wireless node, comprising:
    a processor;
    memory coupled with the processor; and
    instructions stored in the memory and executable by the processor to cause the apparatus to:
        identify a beam timing advance group (TAG) comprising a set of beam pair links (BPLs) that each include a set of beams associated with the first wireless node, the set of beams used for communications between a second wireless node and at least one of the first wireless node or a third wireless node, wherein each BPL includes a transmit beam of the first wireless node and a receive beam of the second wireless node or the third wireless node;
        identify a common timing reference value for the set of beams of the identified beam TAG; and
        transmit a timing advance (TA) command for the beam TAG based at least in part on the common timing reference value, wherein the TA command further comprises a common TA value corresponding to each beam of the set of beams and a set of beam-specific offsets from the common TA value, the set of beam-specific offsets for respective beams of the set of beams.

36. The apparatus of claim 35, wherein the TA command further comprises a set of beam-specific TA values for respective beams of the set of beams.

37. A non-transitory computer-readable medium storing code for wireless communication at a first wireless node, the code comprising instructions executable by a processor to:
    receive, from a second wireless node, a timing advance (TA) command for a beam timing advance group (TAG) comprising a set of beam pair links (BPLs) that each include a set of beams associated with the first wireless node, the set of beams used for communications between the first wireless node and at least one of the second wireless node or a third wireless node, wherein each BPL includes a transmit beam of the first wireless node and a receive beam of the second wireless node or the third wireless node;

identify a common timing reference value for the beam TAG;

determine a TA value for the beam TAG based at least in part on the TA command, the identified common timing reference value, and a common TA value corresponding to each beam of the set of beams, and with a set of beam-specific offsets from the common TA value received in the TA command, the set of beam-specific offsets for respective beams of the set of beams; and adjust a communication timing for one or more of the set of beams based at least in part on the identified common timing reference value and the determined TA value.

38. A non-transitory computer-readable medium storing code for wireless communication at a first wireless node, the code comprising instructions executable by a processor to:

identify a beam timing advance group (TAG) comprising a set of beam pair links (BPLs) that each include a set of beams associated with the first wireless node, the set of beams used for communications between a second wireless node and at least one of the first wireless node or a third wireless node, wherein each BPL includes a transmit beam of the first wireless node and a receive beam of the second wireless node or the third wireless node;

identify a common timing reference value for the set of beams of the identified beam TAG; and transmit a timing advance (TA) command for the beam TAG based at least in part on the common timing reference value, wherein the TA command further comprises a common TA value corresponding to each beam of the set of beams and a set of beam-specific offsets from the common TA value, the set of beam-specific offsets for respective beams of the set of beams.

* * * * *